US012437160B2

(12) United States Patent
Mikhailiuk et al.

(10) Patent No.: US 12,437,160 B2
(45) Date of Patent: Oct. 7, 2025

(54) IMAGE-TO-TEXT LARGE LANGUAGE MODELS (LLM)

(71) Applicant: Snap Inc., Santa Monica, CA (US)

(72) Inventors: Aliaksei Mikhailiuk, London (GB); Tianxiang Gao, Bothell, WA (US); Sergey Smetanin, London (GB); Pavel Savchenkov, London (GB); Hee Hun Kim, Los Angeles, CA (US); Neha Yadav, Seattle, WA (US); Bingqian Lu, Ontario, CA (US)

(73) Assignee: Snap Inc., Santa Monica, CA (US)

( * ) Notice: Subject to any disclaimer, the term of this patent is extended or adjusted under 35 U.S.C. 154(b) by 160 days.

(21) Appl. No.: 18/462,255

(22) Filed: Sep. 6, 2023

(65) Prior Publication Data

US 2025/0077794 A1 Mar. 6, 2025

(51) Int. Cl.

*G06F 40/40* (2020.01)
*G06F 3/0481* (2022.01)
*G06F 3/04845* (2022.01)
*G06V 10/774* (2022.01)
*G06V 20/40* (2022.01)
*G06V 20/50* (2022.01)

(52) U.S. Cl.

CPC ............ *G06F 40/40* (2020.01); *G06F 3/0481* (2013.01); *G06F 3/04845* (2013.01); *G06V 10/774* (2022.01); *G06V 20/41* (2022.01); *G06V 20/46* (2022.01); *G06V 20/50* (2022.01)

(58) Field of Classification Search

USPC ...................................................... 704/1–504

See application file for complete search history.

(56) References Cited

U.S. PATENT DOCUMENTS

| | | | | |
|---|---|---|---|---|
| 7,702,624 | B2 | 4/2010 | King et al. | |
| 7,974,714 | B2 | 7/2011 | Hoffberg | |
| 8,194,646 | B2 | 6/2012 | Elliott et al. | |
| 8,244,830 | B2 | 8/2012 | Robinson et al. | |
| 8,370,362 | B2 | 2/2013 | Szabo | |
| 8,566,115 | B2 | 10/2013 | Moore | |
| 8,626,667 | B2 | 1/2014 | Walker et al. | |
| 9,461,876 | B2 * | 10/2016 | Van Dusen | G06N 20/00 |
| 9,861,898 | B2 | 1/2018 | Miura et al. | |
| 10,002,337 | B2 * | 6/2018 | Siddique | G06Q 30/0601 |
| 10,015,169 | B2 | 7/2018 | Kennedy | |

(Continued)

FOREIGN PATENT DOCUMENTS

WO WO-2023212571 A1 * 11/2023 ............. A61B 34/20

*Primary Examiner* — Marcus T Riley

(74) *Attorney, Agent, or Firm* — Schwegman Lundberg & Woessner, P.A.

(57) ABSTRACT

Described is a system for generating a textual response from a received image by determining participation in an interaction function by a first user of an interaction system, identifying an image associated with the participation, processing data associated with the image using a first machine learning model to identify one or more features within the image, and generating a prompt based on the identified one or more features. The system then identifying instructions for a second machine learning model, processing the prompt and the instructions using the second machine learning model to generate a textual response to the image, and causing display of the textual response within the interaction function to the first user.

20 Claims, 14 Drawing Sheets

(56) References Cited

U.S. PATENT DOCUMENTS

| | | | | |
|---|---|---|---|---|
| 10,020,995 | B2 | 7/2018 | Ricci et al. | |
| 10,360,631 | B1 | 7/2019 | Jezewski | |
| 10,540,906 | B1 | 1/2020 | Fieldman | |
| 10,972,414 | B2 | 4/2021 | Ryu et al. | |
| 10,997,371 | B2 | 5/2021 | Kim | |
| 11,449,785 | B2 | 9/2022 | Ho Kang et al. | |
| 11,568,480 | B2 | 1/2023 | Bjonerud et al. | |
| 11,646,022 | B2 | 5/2023 | Kang et al. | |
| 12,067,769 | B2 * | 8/2024 | Bossard | G06V 10/987 |
| 12,169,626 | B2 * | 12/2024 | Zakharov | G06N 3/08 |
| 12,283,084 | B2 * | 4/2025 | Saraee | G06V 10/761 |
| 2016/0182666 | A1 | 6/2016 | Rathod | |
| 2017/0082447 | A1 | 3/2017 | Ricci | |
| 2018/0232817 | A1 * | 8/2018 | Isaacson | G06F 3/048 |
| 2021/0042830 | A1 | 2/2021 | Burke | |
| 2022/0094647 | A1 * | 3/2022 | Le | G06F 17/18 |
| 2022/0101710 | A1 | 3/2022 | Tunnell | |
| 2022/0392209 | A1 * | 12/2022 | Bossard | G06V 10/987 |
| 2023/0153340 | A1 * | 5/2023 | K | G06F 16/345 704/9 |
| 2024/0295953 | A1 * | 9/2024 | Zakharov | G06T 11/00 |
| 2024/0296535 | A1 * | 9/2024 | Bakunov | G06T 7/0002 |
| 2024/0297957 | A1 * | 9/2024 | Bakunov | G06V 10/945 |
| 2024/0414108 | A1 * | 12/2024 | Sun | H04L 51/216 |
| 2024/0419295 | A1 * | 12/2024 | Smetanin | H04L 51/10 |
| 2025/0077794 | A1 * | 3/2025 | Mikhailiuk | G06F 3/04845 |
| 2025/0104392 | A1 * | 3/2025 | Saraee | G06F 16/438 |

* cited by examiner

IMAGE-TO-TEXT LARGE LANGUAGE MODELS (LLM)

TECHNICAL FIELD

The present disclosure relates generally to large language models (LLMs) and more specifically to generating texts from images using LLMs.

BACKGROUND

LLMs include artificial intelligence (AI) systems that generate human-like text by predicting subsequent words in a sequence. Trained on vast amounts of data, LLMs learn to understand and mimic various forms of human language, allowing them to assist in tasks like translation, summarization, and answering questions.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
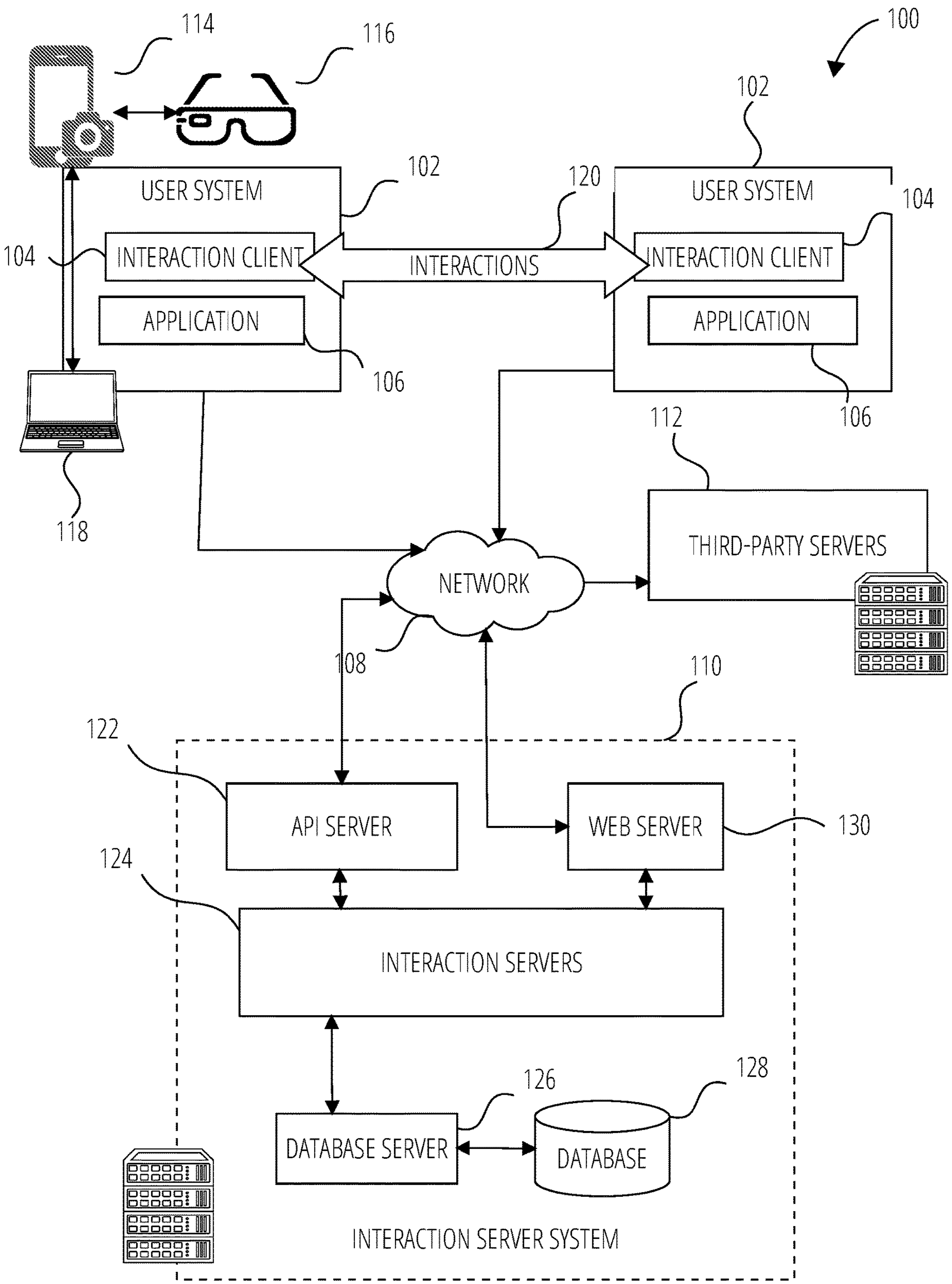
FIG. 1 is a diagrammatic representation of a networked environment in which the present disclosure may be deployed, according to some examples.

Traditional systems typically consist of standalone AI systems, each designed to perform a specific task. This can include traditional image recognition systems based on Convolutional Neural Networks (CNNs) or other similar methods. These systems classify images into predefined categories, recognize objects in the images, and sometimes even detect emotions or activities. However, these systems do not convert these recognitions into coherent, natural language descriptions.

Moreover, text-based AI systems include traditional language model-based systems that generate textual responses based on a given input. These models are typically blind to any non-textual data like images. Responses generated by text-based AI models are only based on text inputs.

Another pitfall is that these traditional AI systems are not integrated and do not communicate or pass information between each other effectively across multiple different types of AIs. This lack of integration results in inefficiencies and limitations in capability.

Example interaction systems described herein overcome these pitfalls by integrating image analysis, content filtering, and text-based AI systems in a coherent, end-to-end process. Such systems generate contextually relevant, engaging, and safe text responses to images, offering a significant advancement over traditional AI systems.

The example interaction system integrates several aspects of AI—including image analysis, content filtering, and natural language processing—into a unified chatbot model. This unique blend of capabilities empowers the chatbot to respond contextually to image inputs with appropriate textual replies.

A first AI module retrieves the image sent by a friend. This module is trained to communicate with various platforms (such as messaging apps, AR/VR devices, etc.), other AI or computer vision modules, and/or the like.

The example system and/or the first AI module applies the image to the second AI to perform image-to-text conversion, image classification, and/or object detection. The second AI module applies computer vision techniques based on deep learning models such as CNNs, which are trained to interpret visual information.

The example system applies the original image or generated feature text to a content filtering function. The content filtering function screens the image and/or the image-derived text for harmful content such as not safe for work (NSFW) elements, drug content, political terms, gender terms, and/or the like. This ensures the responses generated align with community guidelines and social norms.

The example system and/or the first AI module then generates a prompt based on the filtered text that serves as an input to a third AI module. The third AI module also receives as input instructions to conform the responses, such as not mentioning in the response that the response is AI generated. In some cases, the third AI module also receives as input user profile data and/or past interaction data (such as past conversational context) to make the prompt more meaningful for the users exchanging messages in the chat window.

The third AI module includes an LLM that receives the generated prompt and crafts a textual response. The third AI module is trained on vast amounts of data and can generate human-like text, providing a natural and engaging response for responding in the chatroom.

The example system and/or the first AI module then sends the generated response to the chat window for the user to review and send back to their friend. This maintains user agency while greatly reducing the effort needed to craft a response.

Unlike traditional systems that operate in isolation, the proposed example systems described herein present an integrated workflow where different AI modules work together seamlessly. Moreover, in some cases, the first AI module is trained to communicate and pass information to and from other AI modules that perform a specific function on the user input data. This promotes efficiency and broadens capabilities.

By incorporating an image analysis module, the example system interprets non-textual data and weaves such interpretations into conversational context. This is a substantial improvement from traditional text-only models. Moreover, the example system integrates content filtering with the response generation, creating a dynamic and effective system for ensuring content appropriateness.

By providing suggested responses, the example system reduces user effort while maintaining a user's final approval over the reply. This strikes a balance between automation and personal touch.

The example system offers a more integrated, versatile, and contextually-aware solution compared to traditional systems, providing a significant advancement in chatbot technology.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an image-to-text generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
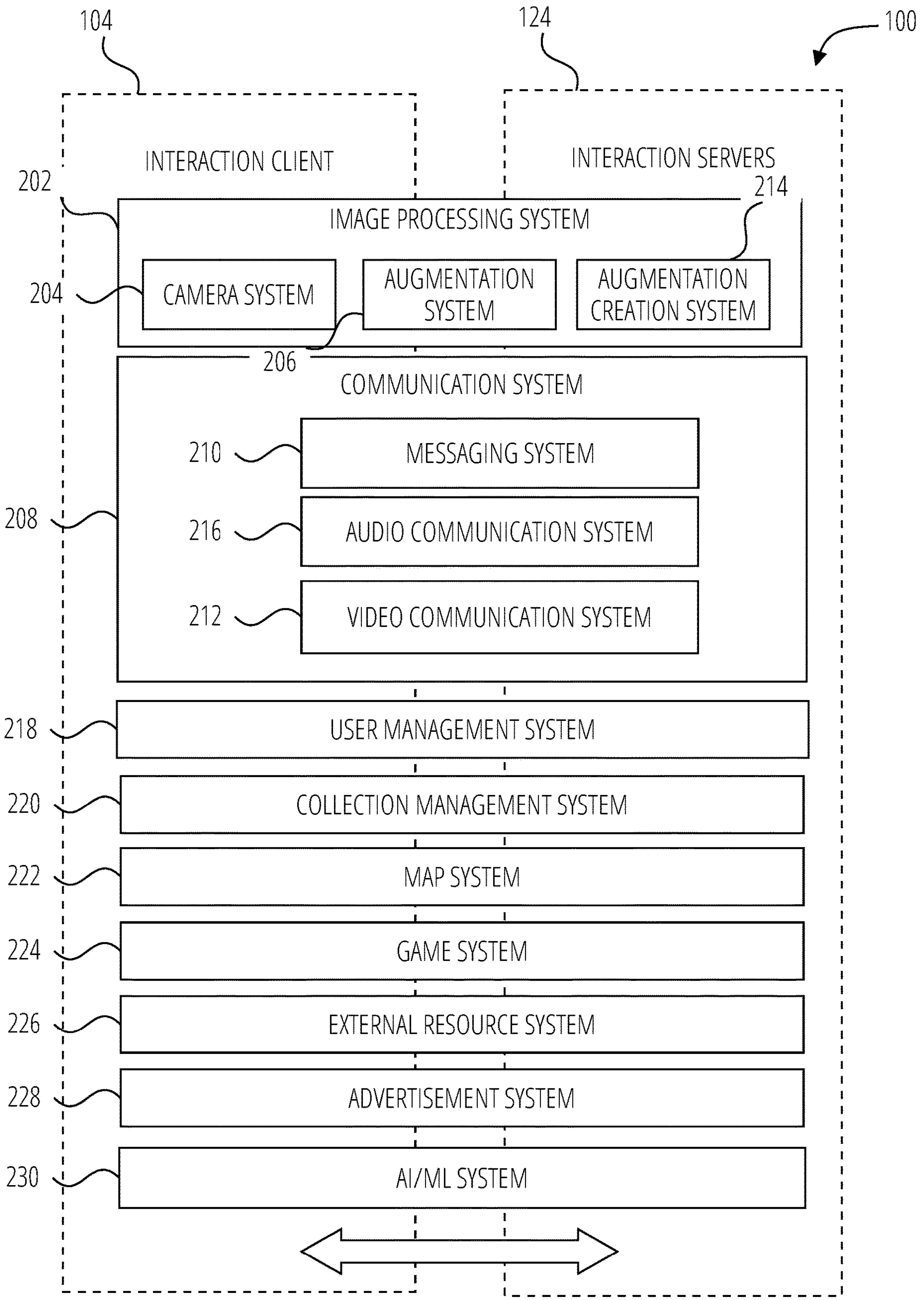
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An AI and machine learning system 230 provides a variety of services to different subsystems within the interaction system 100. For example, the AI and machine learning system 230 operates with the image processing system 202 and the camera system 204 to analyze images and extract information such as objects, text, or faces. This information can then be used by the image processing system 202 to enhance, filter, or manipulate images. The AI and machine learning system 230 may be used by the augmentation system 206 to generate augmented content and AR experiences, such as adding virtual objects or animations to real-world images. The communication system 208 and messaging system 210 may use the AI and machine learning system 230 to analyze communication patterns and provide insights into how users interact with each other and provide intelligent message classification and tagging, such as categorizing messages based on sentiment or topic. The AI and machine learning system 230 may also provide chatbot functionality to message interactions 120 between user systems 102 and between a user system 102 and the interaction server system 110. The AI and machine learning system 230 may also work with the audio communication system 216 to provide speech recognition and natural language processing capabilities, allowing users to interact with the interaction system 100 using voice commands.

Data Architecture

Figure 3:
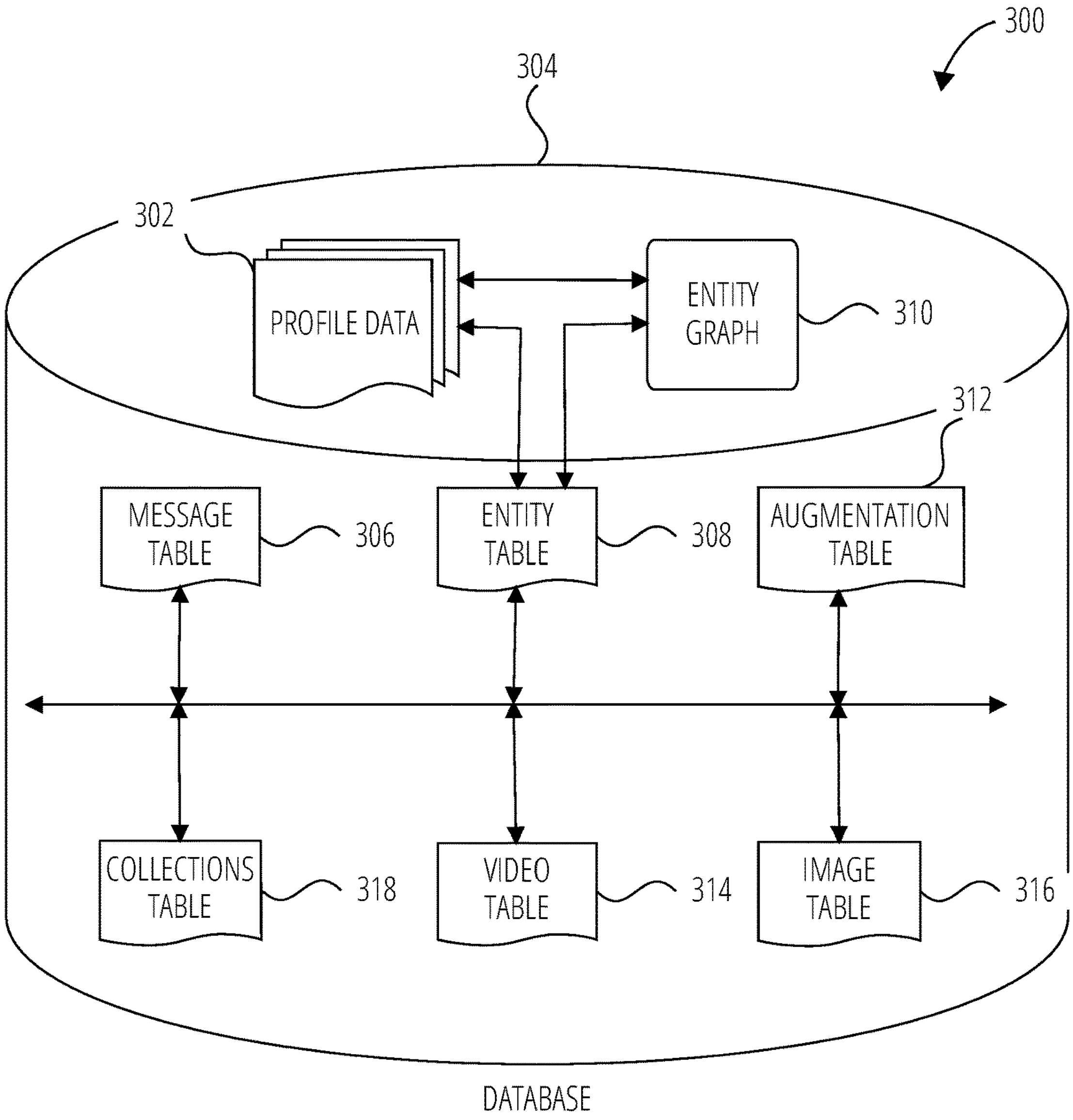
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database). In some cases, the database 304 includes features of or corresponds to database 128 in FIG. 1, and/or vice versa.

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a “friend” relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying “lenses” or AR experiences). An AR content item may be a real-time special effect and sound that may be added to an image or a video.

As described above, augmentation data includes AR content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple AR content items, a user can use a single video clip with multiple AR content items to see how the different AR content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudo random animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Reply to Images with Text via a Chat Bot

Figure 4:
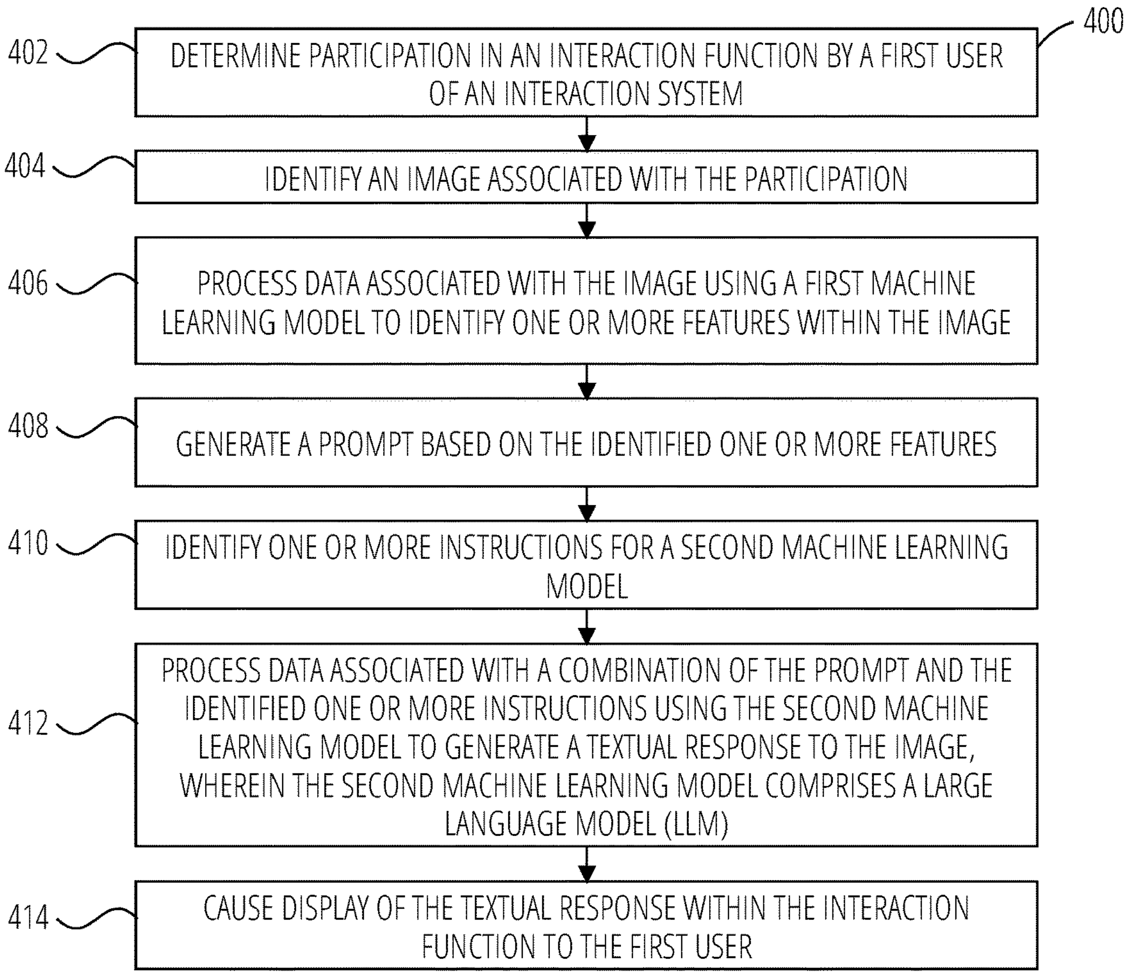
FIG. 4 illustrates an example method for generating a reply to images with text via a chatbot, according to some examples.

FIG. 4 illustrates an example method 400 for generating a reply to images with text via a chatbot, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

FIG. 4 is described as being performed by certain systems or applying certain processes, such as a particular machine learning model or computer vision model, but the processes described herein can be performed by one or more other or the same machine learning models, computer vision models, or a combination thereof.

At operation 402, the system, such as user system 102, determines participation in an interaction function by a first user of an interaction system. For example, a first user receives an image from a second user in a chatroom.

Figure 5:
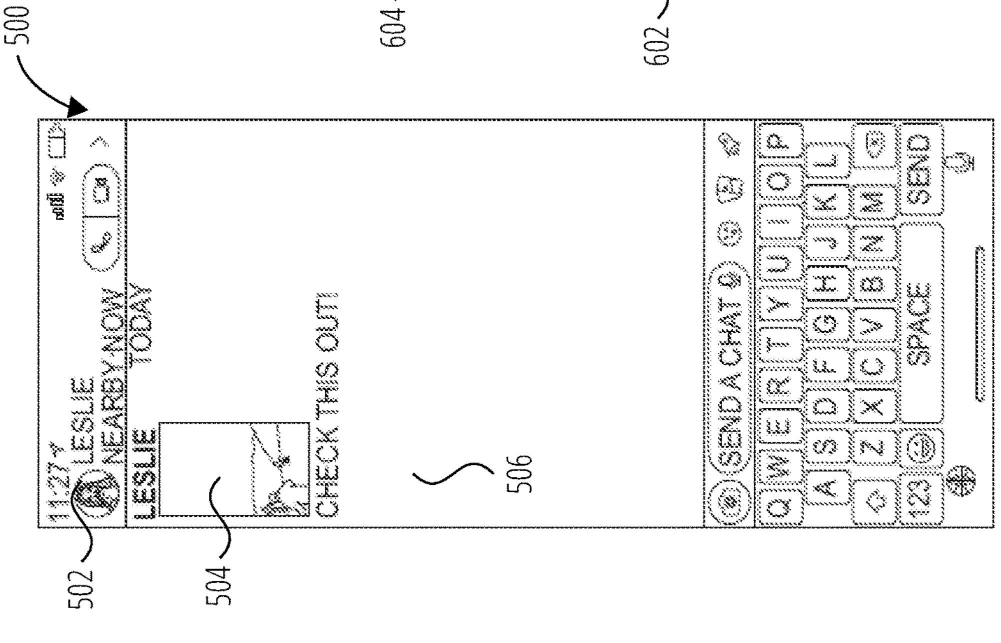
FIG. 5 illustrates an example user interface of a chat room whereby a second user sends an image to a first user, according to some examples.

FIG. 5 illustrates an example user interface 500 of a chat room whereby a second user 502 sends an image 504 to a first user, according to some examples. In the example user interface 500, the image displays the second user skiing on a mountain slope with corresponding text 506 "Check this out!"

In some cases, the second user sends an image to the first user. In some cases, the second user sends a video to the first user, and the example system identifies one or more frame images from the sent video to further assess. In some cases, the video (or a subset of frames from the video) is assessed using the features described herein for the example system. In some cases, a live video stream is sent to the user, and the system identifies one or more frames from the live video stream to assess and generate a response (as further described herein).

In some cases, the interaction function includes a chat window between one or more users. For example, the interaction function includes a message window between a first and second user, among multiple users, and/or with an AI chat bot (e.g., a chat window between a user and an AI chat bot).

At operation 404, the system identifies an image associated with the participation of the interaction function. In some cases, the system identifies that an image or video (and individual image frames of the video or a live video stream) are sent between users. For example, one user can send an image to another user in a chat window. In other examples, one user can post an image on a platform such that other users can view the image.

In some cases, the system identifies an image or video to be further assessed that is recorded by a live camera feed. For example, the system identifies that the user is applying content augmentations on a live camera feed or has sent a recording of a video with content augmentations. In some cases, the system identifies a live camera feed from an Extended Reality (XR) device. In some cases, the system identifies that the user is live streaming on his or her mobile phone with one or more other users.

XR is an umbrella term encapsulating AR, VR, Mixed Reality (MR), and everything in between. For the sake of simplicity, examples are described using one type of system, such as XR or AR. However, it is appreciated that other types of systems apply.

In some cases, the system derives an image from a media content item. Media content items include:

- Content augmentations to enhance images, videos, or other media content items to share with others, such as by adjusting the color or appearance or adding interactive elements such as animations and facial transformations, in real-time.
- Emojis are small images or icons that represent emotions, reactions, or objects.
- Stickers are larger images or animations that can be sent in a chat window.
- Images or photographs can be sent to other users to share visual information or document a particular event.
- Video clips can be used to share recorded content or document a particular event.
- Graphics Interchange Formats (GIFs) are short animations that can be used to add humor or express emotions.

At operation 406, the system processes data associated with the image using a first machine learning model to identify one or more features within the image. For example, pixels of an image is applied to various input nodes of a machine learning model. The first machine learning model is trained on image analysis tasks. In some cases, the first machine learning model includes a CNN for such tasks due to its efficiency in processing grid-like data (such as images) and its ability to detect hierarchical patterns.

The system applies the image through the layers of the CNN. The early layers of a CNN detect basic features like edges, lines, or color gradients. As the information progresses deeper into the network, the features identified become increasingly complex and abstract. For example, later layers might recognize patterns like shapes, textures, or even specific objects.

Each layer of the CNN applies a set of filters (also called kernels or feature detectors) to the input image or feature map, which helps to identify the presence of certain patterns or features. These filters are learned during the training process, which involves exposing the network to a large number of labeled images.

The result of each convolution operation is a feature map, which highlights the areas in the image where the model has identified the presence of a particular feature. These feature maps are then passed through further layers of the network, allowing the model to identify more complex patterns.

In some cases, the system applies a visual transformer (ViT), which can include a deep learning architecture trained to process images and/or text. In some cases, the ViT divides an image into a grid of fixed-size non-overlapping patches. Each patch is linearly embedded into a vector representation, which serves as the input for the model. The ViT includes positional embeddings which help the model understand the spatial layout of the patches within the image.

The ViT includes a transformer encoder which includes multiple self-attention layers and feedforward neural networks. Each self-attention head in the transformer attends to different parts of the input patch embeddings, capturing different aspects of relationships and dependencies among patches.

After self-attention, the outputs are passed through feed-forward neural networks (per position) to apply non-linearity and further transform the features. The ViT employs global average pooling over the patch embeddings. This reduces the spatial dimensions and aggregates information from all patches.

After global average pooling, a linear classification head is added to predict the class label or other relevant output for the image. The patch embeddings capture local information from individual image patches. These embeddings encode features that can be associated with parts of the image, similar to how words in a sentence are represented in NLP.

The self-attention mechanisms within the Transformer layers enable the model to consider relationships and dependencies between different patches. This helps capture global context and long-range dependencies, such as recognizing the interaction between objects in various parts of the image.

By using global average pooling after the transformer layers, the model aggregates the patch-level representations into a holistic image representation. This captures the essential information needed for classification or other downstream tasks. The classification head takes the aggregated representation and maps it to class probabilities or other relevant outputs, making the final prediction about the image's content.

After the final layer of the network, different methods can be used depending on the specific task. For a classification task, the first machine learning model includes a fully connected layer (also known as a dense layer) to classify the image based on the features detected. For object detection tasks, the first machine learning model identifies regions where objects exist and classifies those objects.

For the example of FIG. 4, the image 504 is applied to the first machine learning model. The first machine learning model outputs an indication that the image is of a ski mountain where the second user is currently skiing down the mountain and that the image is of the backside of the second user.

In some cases, the first machine learning model also makes inferences based on features identified in the image and/or in conjunction with user profile information. The first machine learning model makes such inferences based on image analysis and/or user behavior analysis.

As described herein, the AI module uses machine learning models like CNNs to identify and extract features from an image. This could include recognizing objects, detecting actions, understanding the setting, and so on.

The AI module also processes user's historical data. For instance, the AI module assesses a user's past posts, interactions (likes, comments, shares), the people or pages they follow, and so forth in order to understand context or semantics of the image.

For an AR/VR device, the AI module analyzes the user's past interactions within the virtual environment, including their movement patterns, interactions with virtual objects, communication with other users, and more. The interaction system applies machine learning models such as Recurrent Neural Networks (RNNs) or Transformer models for such sequential data.

Once the AI module has understood both the image content and the user's historical data, the system and/or the AI module makes inferences by combining this information. For example, if the system has detected a dog in an image and knows from the user's social media history that they often interact with posts about dogs, the AI module infers that the user would be interested in the image or would like to share it with their friends.

As another example, if the system recognizes a certain type of virtual object in an AR/VR scenario and knows from the user's history that they frequently interact with this type of object, the AI module infers that the user would want to interact with the object in some way.

The AI module uses user profile data that includes user data or historical user interaction to give context to the provided image. User profile data includes personal information, such as a name, email address, phone number, date of birth, gender, education, occupation, interests, and/or the like.

User profile data includes profile pictures, cover photos, biographies, and any other customizations made by the user to their online profiles. User profile data includes connections and relationships with other users, such as a user's friends, followers, and connections, as well as the groups and pages they follow or like.

User profile data includes content users share, such as text, photos, videos, and links, and direct messages, comments, and any other interactions users have within the platform. Profile data of users includes location data, such as the user's city or precise GPS coordinates, such as when using location-based features or when sharing content with location tags.

User profile data includes how users interact with the platform's services, such as the content they view, like, share, or engage with, as well as the features they use and the duration of their sessions. User profile data includes data about the devices used to access their services, including device model, operating system, browser type, internet protocol (IP) address, and unique identifiers like device IDs or cookies.

In some cases, the first machine learning model also identifies a sentiment based on features identified in the image and/or in conjunction with user profile information. The AI module identifies sentiment by identifying features within the image and/or by assessing user past behavior using the user historical data.

The AI module identifies sentiment conveyed by an image by extracting features and then determining how these features correlate with various sentiments. This could involve recognizing objects, colors, facial expressions, and body language (in case of humans in the image), and then associating these with different emotions. For instance, an image featuring bright colors and smiling people might be associated with positive sentiments, while an image with darker colors and frowning faces might be seen as negative.

In some cases, the AI module analyzes the user's past interactions to understand sentiment trends. For example, a user's sentiment might be inferred from the types of posts they interact with, the sentiment of their own posts, and the types of pages or accounts they follow. In a VR/AR context, sentiment is inferred from the user's actions, choices, and communication within the virtual environment.

To generate a sentiment prediction based on both the image and user historical data, the AI module applies the outputs of the image sentiment analysis and user historical data analysis. For example, if an image sentiment analysis suggests positive sentiment (e.g., a picture of a party), and the user's history also indicates a positive sentiment towards similar images or events, the AI module infers a positive sentiment for the user towards the current image. Conversely, if a user's history indicates they usually react negatively to similar content, the system might infer a negative sentiment, despite the image's generally positive sentiment.

At operation 408, the system generates a prompt based on the identified one or more features. The system identifies the one or more features and generates text indicative of such features, where the prompt is generated based on the generated text. In some cases, the identified features are explicit features that are identified from the images. In some cases, the identified features are implicit features, such as features in the latent space of the model.

The system converts the identified features from the image (objects, classes, sentiments, etc.) into a format that can be understood by a language model. In some cases, the system converts these features into a text string that describes the image. For example, if a dog and a frisbee are identified in the image, this could be encoded as "A dog playing with a frisbee."

Additional contextual data can also be added based on the scenario. For example, if the sentiment analysis identifies the image as cheerful, the encoded string might be expanded to "A cheerful scene of a dog playing with a frisbee."

The system then takes this text string as input and generates a prompt based on it. This could be done using a variety of techniques. In some cases, the system prepends a standard prompt to the text string. For example, the prompt might be "Describe what's happening in this image:", which is added to the text string to create "Describe what's happening in this image: A cheerful scene of a dog playing with a frisbee."

In some cases, a system generates a custom prompt based on the input string, like "How would you feel if you were the dog playing with the frisbee in this cheerful scene?"

If the system has access to user history or preferences, the system can also tailor the prompt to the individual user. For example, if the user often uses short sentences in their responses, the prompt could be simplified to "Dog. Frisbee. Thoughts?"

The AI model checks the generated prompt for appropriateness and relevance, modifying or rejecting it if it does not meet certain criteria (as further described herein). This could involve checking for sensitive content, ensuring the prompt is relevant to the image, filtering out nonsensical prompts, filtering out inappropriate content, and/or the like. In some cases, the AI is trained on a database of terms to check for.

In some cases, the AI is trained to identify inappropriate content based on training data of terms and training data indicating an inappropriate score of the corresponding term, such that the AI can make determinations on new terms.

In some examples, the system generates the prompt for the first user automatically based on an intent identified from the image. The system generates prompts for a user based on a user's past activity, interests, and behavior patterns. The system generates personalized prompts that include topics the user may find appealing, such as if a user frequently interacts with a certain type of content about technology.

In some examples, by utilizing a user's geographic location, the system can generate prompts that are relevant to their local area, such as events, news, or cultural topics. In some examples, the system can create prompts based on the time of day, season, or upcoming events or holidays, such as events that are time sensitive.

In some examples, the system can use the user's social connections to generate prompts related to their friends, family, or other users they follow, such as a birthday or new connection with another user. In some examples, based on the user's activity within a specific application or AR experience, the system can generate prompts related to that context.

In some examples, the system can use the user's in-application actions, such as likes, comments, and shares, to generate prompts related to their interests. For example, if a user frequently interacts with content about cooking in a recipe application, the system may generate a prompt related to a user's favorite dish to prepare at home in response to an image of cooking at home.

In some examples, by utilizing sensors and data from the user's mobile device or AR headset, the system creates context-aware prompts based on their physical environment. In some examples, the system can generate prompts based on real-time events occurring within the application or AR experience, such as a live-streamed event. In some examples, the real-time interaction data includes a current camera feed from a camera system of the first interaction client 104.

In some examples, the system uses the user's past activity, preferences, and behavior patterns within the application or AR experience to generate a prompt for the user. In some examples, the system gathers user profile information, such as a calendar of appointments or objects detected in a camera feed of an AR device to generate a prompt. In some examples, by incorporating gamification elements, the system creates prompts that encourage user participation and engagement, such as checking on a feature within a game.

At operation 410, the system identifies one or more instructions for a second machine learning model. The system identifies instructions that serve as guidelines that help tailor the generation of the response by the second machine learning model toward interactions that are appropriate, respectful, and engaging, in line with these guidelines.

In some cases, these instructions form part of the training data for the AI, with the rules implicitly guiding the model's output. In some cases, the instructions are provided with the prompt to the second machine learning model.

In some cases, the instructions include notifying the AI to prevent misleading the user, such as not creating false perceptions of personal relationships between the users and/or with the AI module.

In some cases, the instructions include an indication of the chatbot's role. For example, the instructions can indicate that the response is only to be provided when other users send an image or video in a chat window.

In some cases, the instructions include generating a response mimicking how a human person would communicate with the second user that posted the image. The instructions include drafting a response as if a real human person drafted the response and without indicating that the AI module drafted the response. This helps create a more engaging and natural interaction while also aiming to not make the receiving user think an AI drafted the response.

In some cases, the instructions include a guideline on length or type of the response. For example, the instructions can indicate that the response should be fewer than a couple of sentences or that certain emojis should or should not be used.

In some cases, the instructions are custom tailored toward the user, such as based on the user historical information described herein. For example, the user may historically send responses in a certain sentiment and/or in a certain length.

In some cases, the instructions include guidelines to conform to neutral, respectful, and lighthearted, avoiding potentially controversial or sensitive topics. For example, the instructions may indicate to never have negative opinions or make adversarial judgments on sensitive topics such as: politics, religions, religious figures, ethnic groups, genders, nationalities, sexual orientations.

In some cases, the instructions include guidelines to avoid certain terms, such as terms that are specific to gender, private body parts, curse words, and/or the like.

At operation 412, the system processes data associated with a combination of the prompt and the identified one or more instructions using the second machine learning model to generate a textual response to the image.

The LLM's task is to generate a coherent, contextually appropriate, and engaging textual response to the image based on the input it received (the prompt and the instructions). The LLM is capable of doing this due to its training on diverse data, including many kinds of language usage scenarios.

The LLM is trained to generate human-like text that follows the style, tone, and content of the provided input. In this example, the LLM will use the information in the prompt and adhere to the instructions to generate a response.

At operation 414, the system causes display of the textual response within the interaction function to the first user. This response is suggested in the chat window as a potential reply to the image that the user's friend sent.

The system thus enables an interactive, engaging, and contextually relevant chat experience, overcoming the limitations of traditional AI systems, which do not integrate image understanding with text generation in a chat room environment. In this way, the system provides a unique solution that intelligently bridges the gap between image analysis and natural language processing, enabling a new level of interaction for users of the interaction system.

Figure 6:
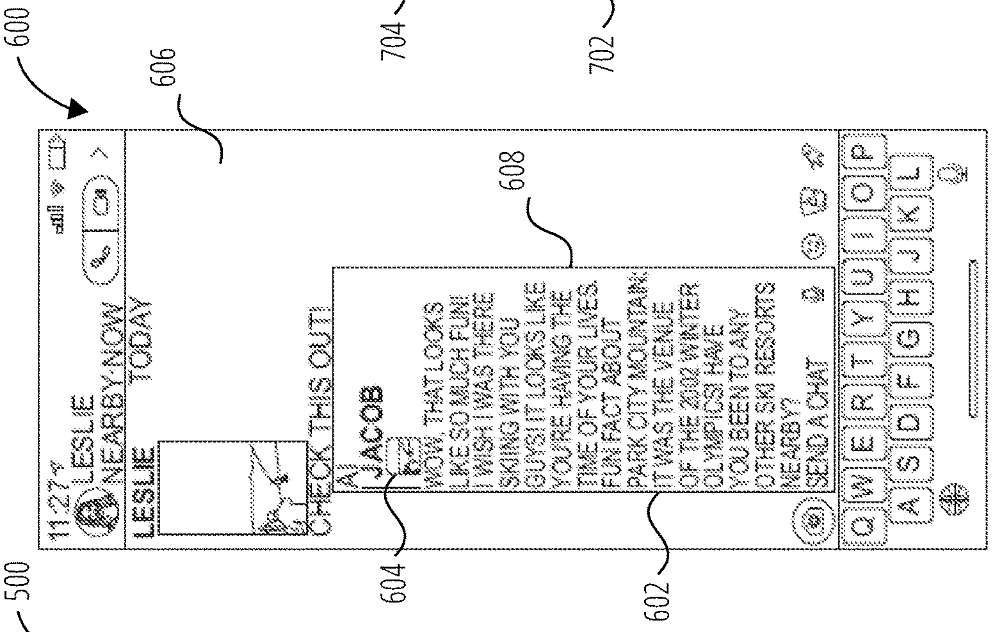
FIG. 6 illustrates a user interface of displaying a potential response to the image, according to some examples.

FIG. 6 illustrates a user interface 600 displaying a potential response to the image, according to some examples. In the example of FIG. 6, the interaction function includes a chat window that displays exchanged messages between the first user and a second user.

The system causes display of the textual response by displaying the response 602 adjacent to a copy 604 of the image. In some cases, the system reduces a size of at least a portion of the chat window 606 in a user interface and apportions user interface space 608 for display of the textual response. The system initiates display of the generated response adjacent to the copy of the image in the apportioned user interface space.

Figure 7:
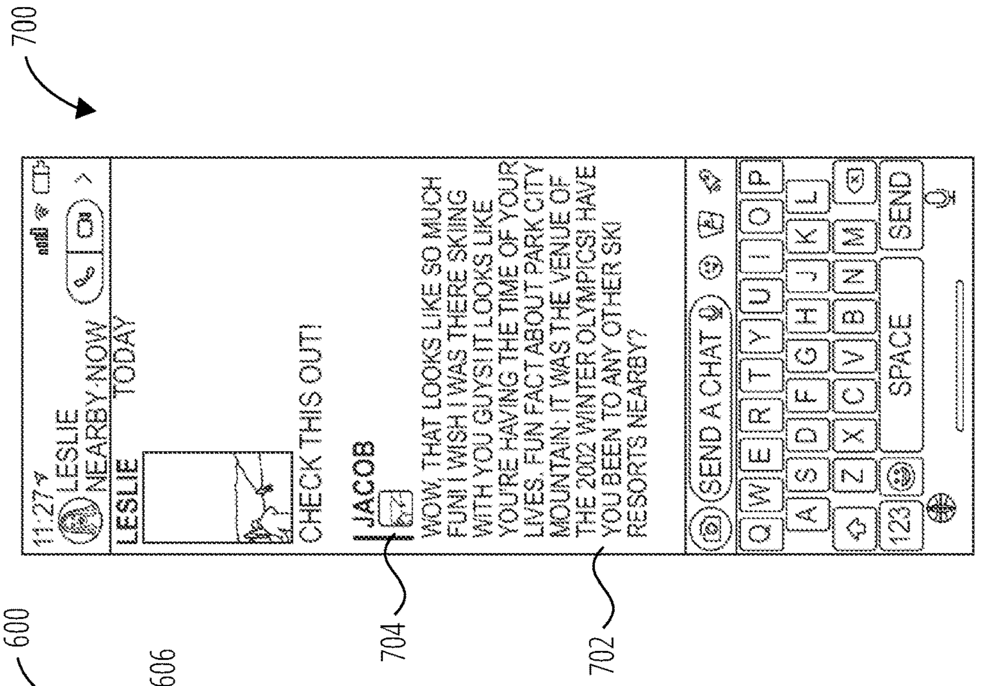
FIG. 7 illustrates a user interface displaying the response sent to the chat window, according to some examples.

FIG. 7 illustrates a user interface 700 displaying the response sent to the chat window, according to some examples. The user selects a user interface element to send the response into the chat window for the user 502 to see. In response to a user selection to send the response into the chat window, the system causes display of the generated response 702 adjacent to the copy 704 of the image within the chat window.

The system generates a graphical user interface and/or graphical user interface data that optimizes valuable user interface real estate. For example, the system provides a display of textual responses to images by apportioning part of the chat window for the textual responses, where a copy of the image is placed adjacent to the suggested response. Such an improved display interface allows a user to access desired responses more quickly.

Advantageously, the specific and practical manner of displaying the limited set of information to the user via the user interface apportioning improves the technical problem for the user interface in electronic devices over conventional systems.

In some examples, the system allows for efficient use of the user interface, reducing the number of graphical user interfaces needed to review the response and send the response into the chat window. Advantageously, the system, according to some examples, provides a practical solution to a technical problem of limited user interface real estate.

Interaction functions include sending photos or videos to friends, either individually or in groups, which are edited with text, stickers, filters, and drawings before being sent. Interaction functions include capturing a video or audio, inputting text, or other communications that disappear after certain conditions are met, such as being viewed once or setting a time limit, creating a more ephemeral and casual sharing experience.

In some examples, interaction functions include generating or viewing a collection of videos, messages, stickers, or other media content items that are visible to friends for a certain period of hours (e.g., 24 hours). Interaction functions include displaying media content items from other users, such as publishers, creators, and influencers, where users explore and subscribe to different channels to receive updates on their favorite content. Interaction functions include map and location functions, such as users sharing their location with friends and viewing their friends' locations on a map, or exploring a map with points of interest categorized by other users by location and events.

In some examples, interaction functions include generating or applying various filters and content augmentations to enhance images, videos, or other media content items to share with others, such as by adjusting the color or appearance or adding interactive elements such as animations and facial transformations, in real-time. Interaction functions include saving favorite media content items with other users in a private archive, where users access these saved media content items later, edit them, or share them with friends.

Interaction functions include personalizing or applying avatars, which are used as a profile picture to be viewed by others and in stickers, chat, and image/video decorations. Interaction functions include playing multiplayer games that users play with their friends directly within the user interface of the system to share messages and media content items.

Interaction functions include capturing data by an AR device. In some examples, the interaction system 100 captures motion and position data, such as data from accelerometers, gyroscopes, and magnetometers, to track user movement or orientation. In some examples, the interaction system 100 captures eye-tracking data, which monitors the user's eye movements and focus, gaze-based interactions, objects the user is focused (or not focused) on, or user attention patterns.

In some examples, the interaction system 100 captures facial expressions. In some examples, the interaction system 100 captures biometric data, such as heart rate, body temperature, or skin conductivity. In some examples, the interaction system 100 captures data related to user interactions within the virtual or augmented environment, such as objects or buttons users interact with, the time spent in specific areas, or the choices users make. In some examples, the interaction system 100 captures voice data, voice recognition, voice commands, and/or the like.

In some examples, the interaction system 100 captures location data, such as a user's GPS location. In some examples, the interaction system 100 captures usage data related to how and when the devices are used, session duration, frequency of use, and user engagement with specific content or applications. Such data can be assessed by one or more AI modules to identify user sentiment, context, custom-tailoring prompt information, generating instructions to be processed with the prompt, and/or the like.

Architectural Diagram for Generating Textual Responses to Images

Figure 8:
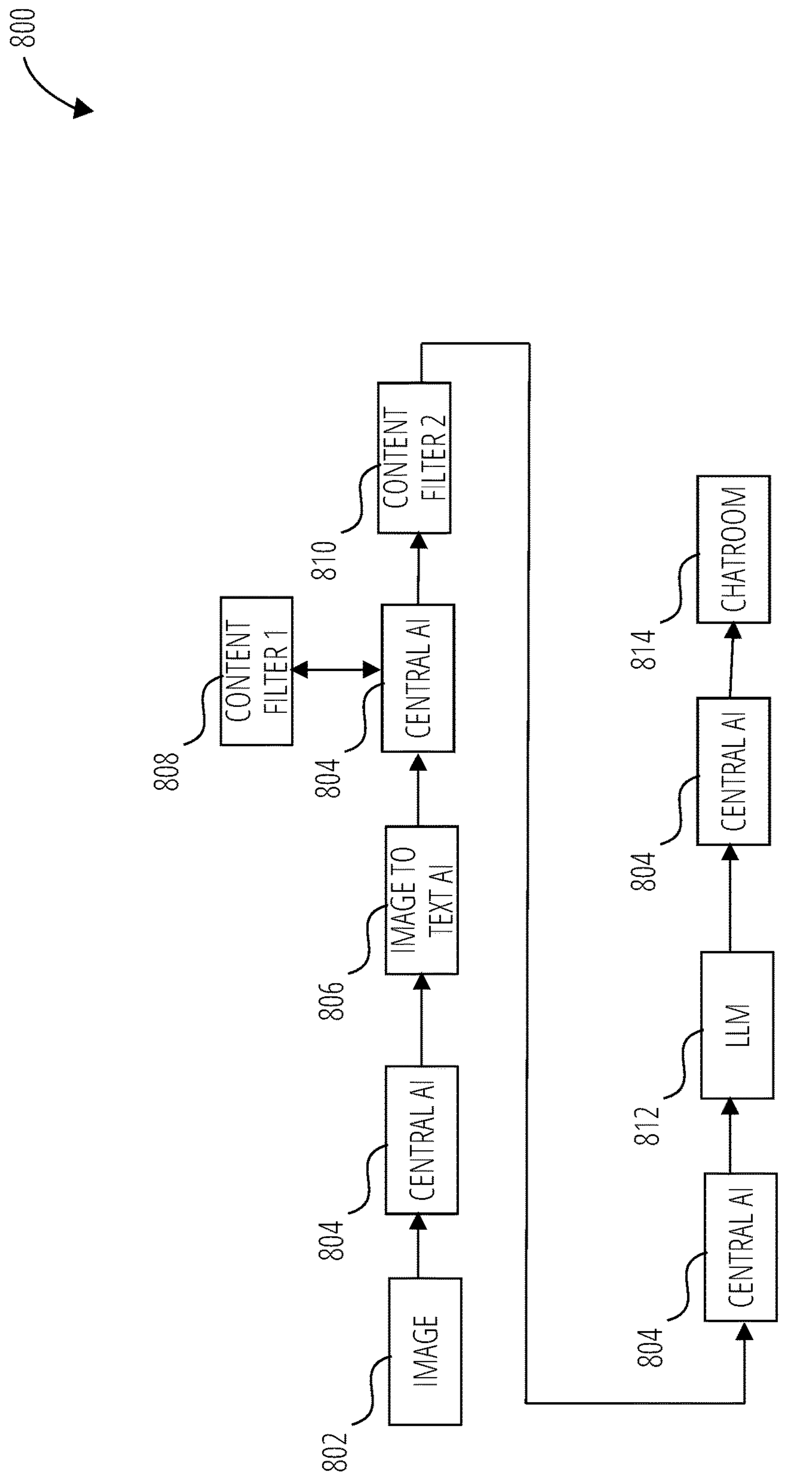
FIG. 8 illustrates an architectural diagram for generating textual response to images, according to some examples.

FIG. 8 illustrates an architectural diagram 800 for generating textual response to images, according to some examples. The system receives and/or identifies an image 802, such as an image in a chatroom.

The image is fed into a central AI 804 that facilitates the communication between systems and models in order to retrieve appropriate features to apply to the images and data derived thereof. The central AI 804 performs certain operations, such as described herein for FIG. 8, whereby the central AI 804 is trained to respond to certain contexts, such as generating a recommended response when an image is detected in an interaction function for the user to review and send to the interaction platform (e.g., sending the textual response to the chat room).

The central AI 804 applies the image to an image to text AI 806 to generate textual descriptions of features identified in the images. The image to text AI is trained to identify features within images.

The central AI 804 receives the identified features and filters the textual descriptions using a first content filter 808. The first content filter 808 applies filtering of the textual descriptions by looking for inappropriate content, such as content related to drugs, weapons, not-safe-for-work NSFW content, or offensive content (e.g., gender-specific words, and/or the like). In some cases, the first content filter includes an abusive language detection model that filters for certain content, such as content related to self-harming, weapons, drugs, and/or the like.

The central AI 804 generates a prompt based on the filtered textual descriptions to be processed by a LLM 812. Before the prompt is processed, a second content filter 810 applies filtering on the prompt to look for inappropriate content. In some cases, the second filter filters for abstract concepts, such as political bias, religious comments, and/or the like. It is appreciated that the types of content filtered for the first content filter can be filtered instead by the second content filter, and vice versa.

The central AI 804 receives a filtered prompt and applies the filtered prompt and additional instructions (e.g., guidelines described herein) to the LLM 812. The LLM 812 is trained to receive prompts and instructions and generate responses based on such input.

The central AI 804 receives such responses and sends the suggested response back to the interaction function (e.g., a chatroom 814) where the image was received to enable a response to the image.

Systems and methods described herein include training a machine learning network, such as training to generate text from images, generating responses from input prompts and instructions, and overall facilitation of generating responses from input images. The machine learning algorithm can be trained using historical information that include historical image data and resulting responses.

Training of models, such as AI models, is necessarily rooted in computer technology, and improves modeling technology by using training data to train such models and thereafter applying the models to new inputs to make inferences on the new inputs. Here, the new inputs can be images sent between users. The trained machine learning model can determine responses for these images.

Such training involves complex processing that typically requires a lot of processor computing and extended periods of time with large training data sets, which is typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new image data) and make predictions for which the model was trained based on the weights or scores that were adjusted during training. Such training of the machine learning models described herein reduces false positives and increases the performance of generating textual responses to images.

Content Augmentations and Textual Responses

Figure 9:
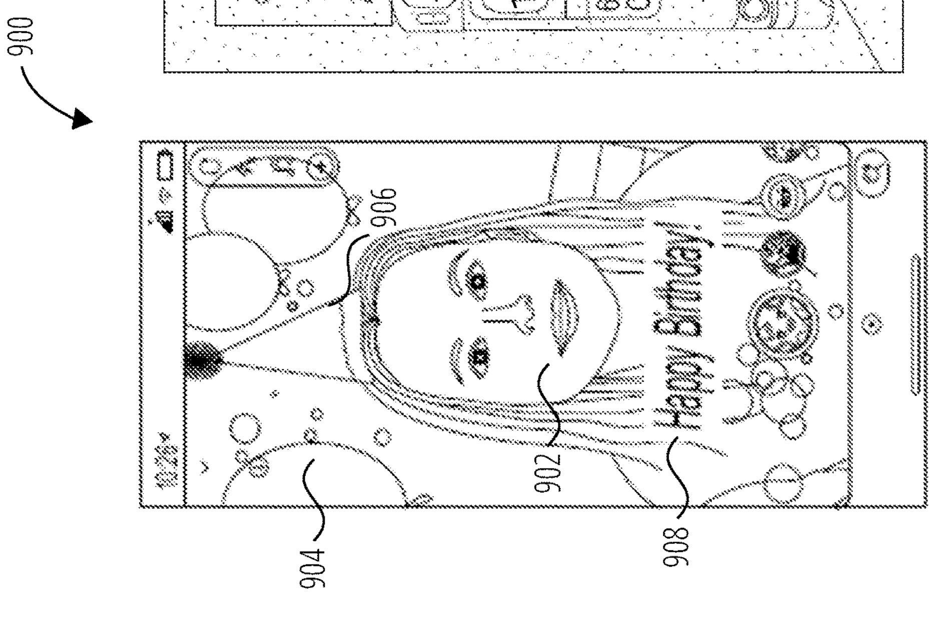
FIG. 9 illustrates a user interface of content augmentations and generated textual response, according to some examples.

FIG. 9 illustrates a user interface 900 of content augmentations and generated textual response, according to some examples. The system captures an image or video of a user 902, whereby the user assesses the image to gather contextual information of the user. The image is a frame from a camera feed of a camera system and the textual response includes applying at least one recommended content augmentation to the camera feed.

In the example of FIG. 9, the user 902 is wearing a birthday hat 906 and there are balloons 904 in the background. The system identifies such context and generates a "Happy Birthday!" textual response 908 for the user to apply.

The user can take a picture or record a video with the content augmentation applied to send to the interaction platform (e.g., send to a chatroom or post for other users to see). In some examples, the AI generating the response is a generative AI model that not only generates a textual response but also generates and/or identifies relevant content augmentations, such as content augmentations related to birthdays for FIG. 9. The recommended content augmentation augments, modifies, or overlays content onto the camera feed with one or more digital elements, wherein one or more digital elements include at least one of an image, an animation, or audio.

In some cases, the system displays a selectable user interface element. In response to a user selection of the selectable user interface element, the system captures a picture or video of the camera feed with the applied at least one recommended content augmentation.

XR Devices and Textual Responses

Figure 10:
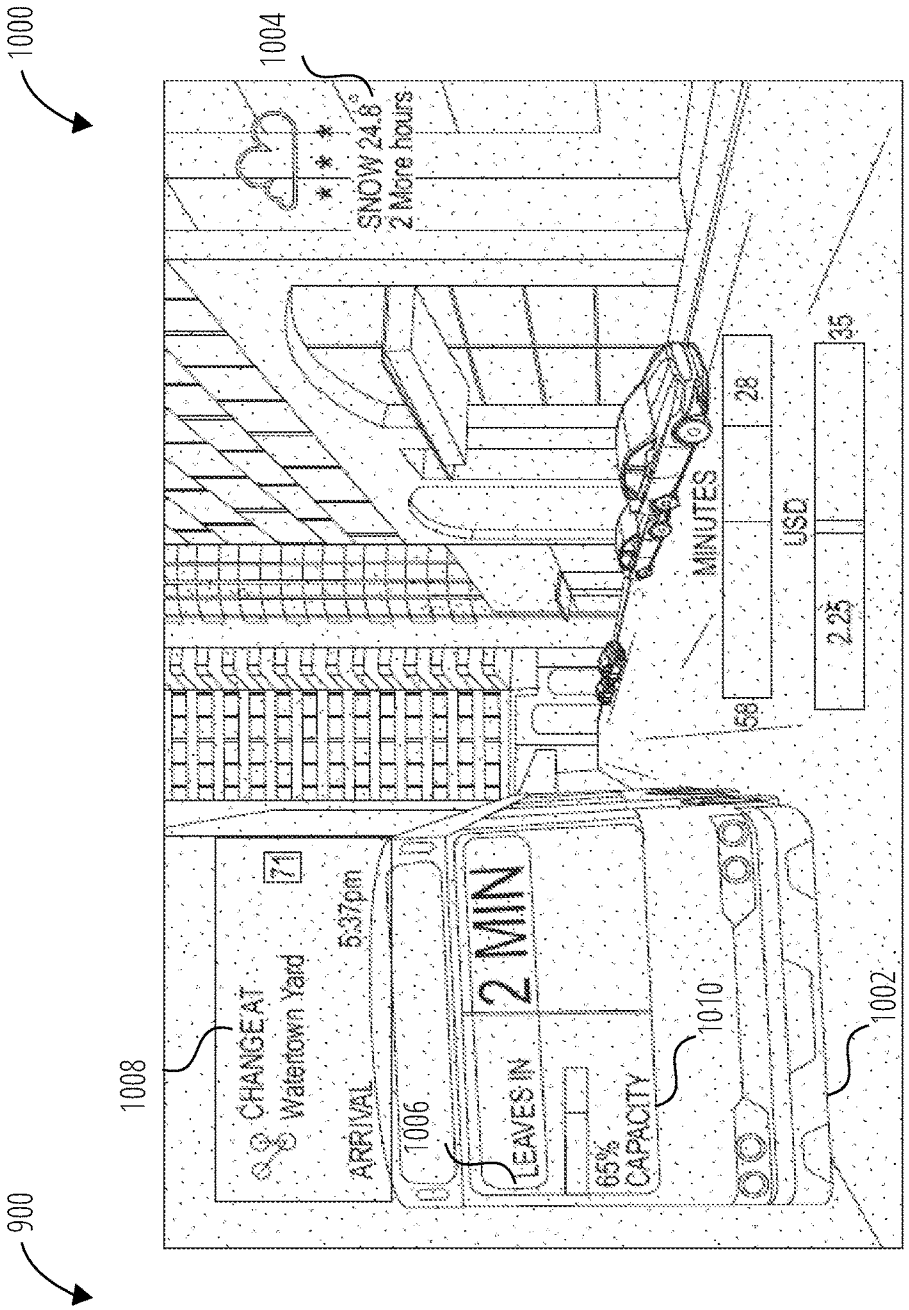
FIG. 10 illustrates a user interface of an augmented reality/virtual reality (AR/VR) device, according to some examples.

FIG. 10 illustrates a user interface 1000 of a XR device, according to some examples. The user is standing in front of a bus 1002 on a snowy day where the VR device takes a snapshot image and the system identifies context, sentiment, and/or features from the image, as described herein.

The system identifies that the user may take the bus to a certain destination and generates text displaying the weather 1004, departure time 1006 of the bus, navigation information 1008 such as a change station and arrival time, a capacity of the bus 1010, and/or the like.

In some examples, the AI generating the response is a generative AI model. The generative AI model generates content augmentations that can be applied to live camera feeds, such as the features illustrated in FIG. 9. In some cases, the AI applies data from XR devices, such as receiving a live camera feed from an XR device and applying digital content onto real world objects and/or virtual objects shown in the live camera feed.

Content Filtering

Figure 11:
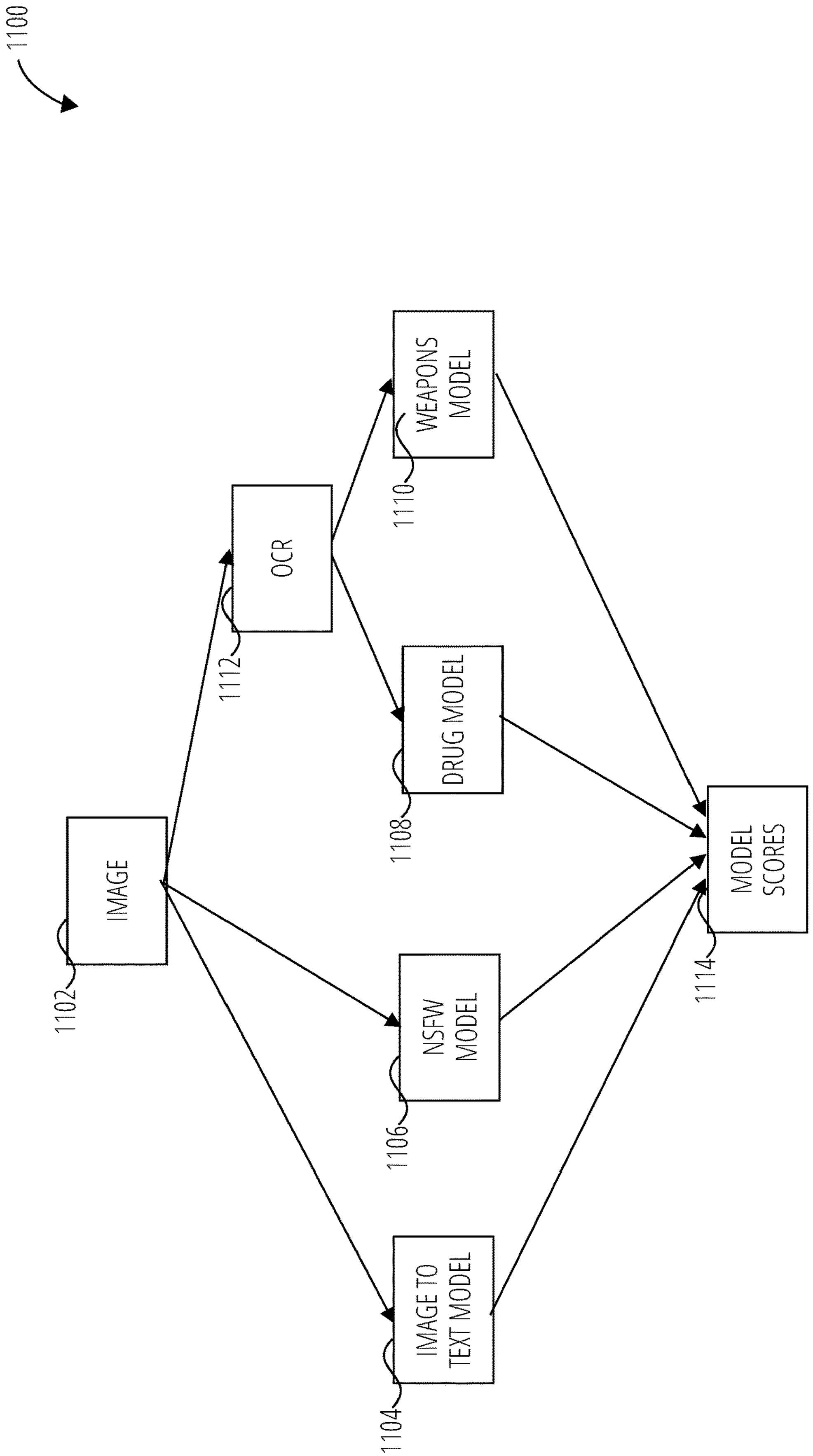
FIG. 11 illustrates a block diagram for filtering inappropriate content, according to some examples.

FIG. 11 illustrates a block diagram 1100 for filtering content, such as inappropriate content, according to some examples. The system starts by receiving an image 1102. The image is processed through several parallel processing pipelines.

The image is processed through an image-to-text model 1104 to generate a textual description of features, sentiment, and/or the like identified in the image. In parallel, the image is processed through other filters, such as a NSFW model 1106, a drug model 1108, and a weapons model 1110.

In some cases, the models look to identify content, such as inappropriate content, identified in the image itself. In such cases, the image is processed by an optical character recognition module 1112 to identify text that is already displayed in the image. The identified text is then processed by one or more content filter modules, such as the drug model 1108 and weapons model 1110.

In some cases, model scores 1114 are collected and the system makes a determination based on such model scores. For example, the model scores may indicate that there is too much inappropriate content. The system can feed the appropriate guidelines to rerun the response to recreate the response in order to find a response that meets a certain model score threshold. In some cases, if the model scores do not meet a certain threshold, the system decides not to provide a recommended response.

In some cases, the model scores are compared to the threshold to make certain decisions. The model scores can be averaged, a maximum or minimum for an individual model score can be tested via a threshold, each individual model score can be tested with the threshold, and/or the like.

In some cases, the content model filters are trained to identify inappropriate characteristics, such as content pertaining to a gender, an aesthetic characteristic, a private body part, a political topic, a religious topic, or a sexual orientation.

In some cases, the generated prompt is applied to one or more of the content filters. In some cases, the generated textual features from the image are applied to one or more of the content filters. In some cases, the image itself is applied to one or more of the content filters.

Data Communications Architecture

Figure 12:
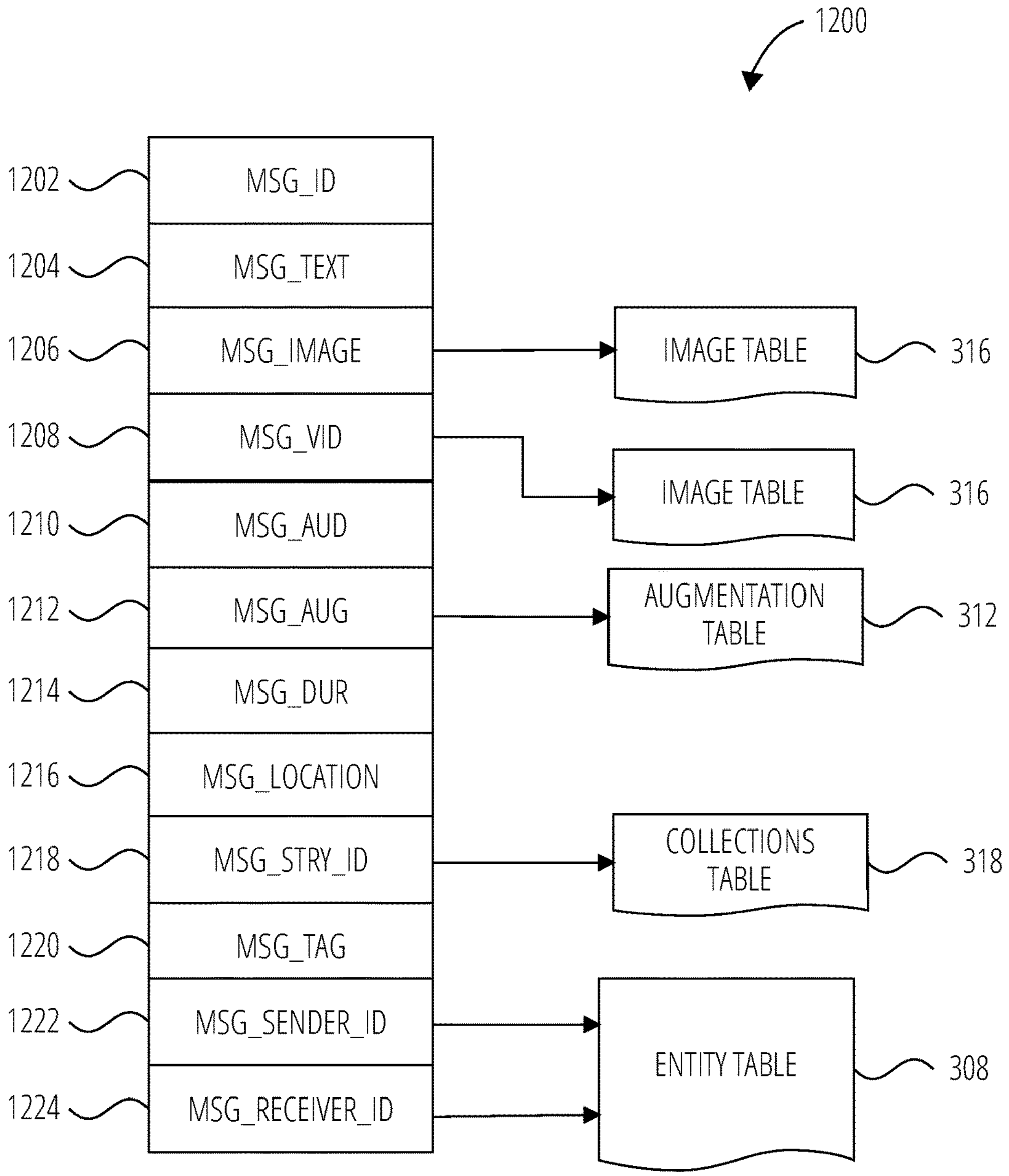
FIG. 12 is a diagrammatic representation of a message, according to some examples.

FIG. 12 is a schematic diagram illustrating a structure of a message 1200, according to some examples, generated by an interaction client 104 for communication to a further interaction client 104 via the interaction servers 124. The content of a particular message 1200 is used to populate the message table 306 stored within the database 304, accessible by the interaction servers 124. Similarly, the content of a message 1200 is stored in memory as "in-transit" or "in-flight" data of the user system 102 or the interaction servers 124. A message 1200 is shown to include the following example components:

- Message identifier 1202: a unique identifier that identifies the message 1200.
- Message text payload 1204: text, to be generated by a user via a user interface of the user system 102, and that is included in the message 1200.
- Message image payload 1206: image data, captured by a camera component of a user system 102 or retrieved from a memory component of a user system 102, and that is included in the message 1200. Image data for a sent or received message 1200 may be stored in the image table 316.
- Message video payload 1208: video data, captured by a camera component or retrieved from a memory component of the user system 102, and that is included in the message 1200. Video data for a sent or received message 1200 may be stored in the image table 316.
- Message audio payload 1210: audio data, captured by a microphone or retrieved from a memory component of the user system 102, and that is included in the message 1200.
- Message augmentation data 1212: augmentation data (e.g., filters, stickers, or other annotations or enhancements) that represents augmentations to be applied to message image payload 1206, message video payload 1208, or message audio payload 1210 of the message 1200. Augmentation data for a sent or received message 1200 may be stored in the augmentation table 312.
- Message duration parameter 1214: parameter value indicating, in seconds, the amount of time for which content of the message (e.g., the message image payload 1206, message video payload 1208, message audio payload 1210) is to be presented or made accessible to a user via the interaction client 104.
- Message geolocation parameter 1216: geolocation data (e.g., latitudinal and longitudinal coordinates) associated with the content payload of the message. Multiple message geolocation parameter 1216 values may be included in the payload, each of these parameter values being associated with respect to content items included in the content (e.g., a specific image within the message image payload 1206, or a specific video in the message video payload 1208).
- Message story identifier 1218: identifier values identifying one or more content collections (e.g., "stories" identified in the collections table 318) with which a particular content item in the message image payload 1206 of the message 1200 is associated. For example, multiple images within the message image payload 1206 may each be associated with multiple content collections using identifier values.
- Message tag 1220: each message 1200 may be tagged with multiple tags, each of which is indicative of the subject matter of content included in the message payload. For example, where a particular image included in the message image payload 1206 depicts an animal (e.g., a lion), a tag value may be included within the message tag 1220 that is indicative of the relevant animal. Tag values may be generated manually, based on user input, or may be automatically generated using, for example, image recognition.
- Message sender identifier 1222: an identifier (e.g., a messaging system identifier, email address, or device identifier) indicative of a user of the user system 102 on which the message 1200 was generated and from which the message 1200 was sent.

Message receiver identifier 1224: an identifier (e.g., a messaging system identifier, email address, or device identifier) indicative of a user of the user system 102 to which the message 1200 is addressed.

The contents (e.g., values) of the various components of message 1200 may be pointers to locations in tables within which content data values are stored. For example, an image value in the message image payload 1206 may be a pointer to (or address of) a location within an image table 316. Similarly, values within the message video payload 1208 may point to data stored within an image or video table 316, values stored within the message augmentation data 1212 may point to data stored in an augmentation table 312, values stored within the message story identifier 1218 may point to data stored in a collections table 318, and values stored within the message sender identifier 1222 and the message receiver identifier 1224 may point to user records stored within an entity table 308.

System with Head-Wearable Apparatus

Figure 13:
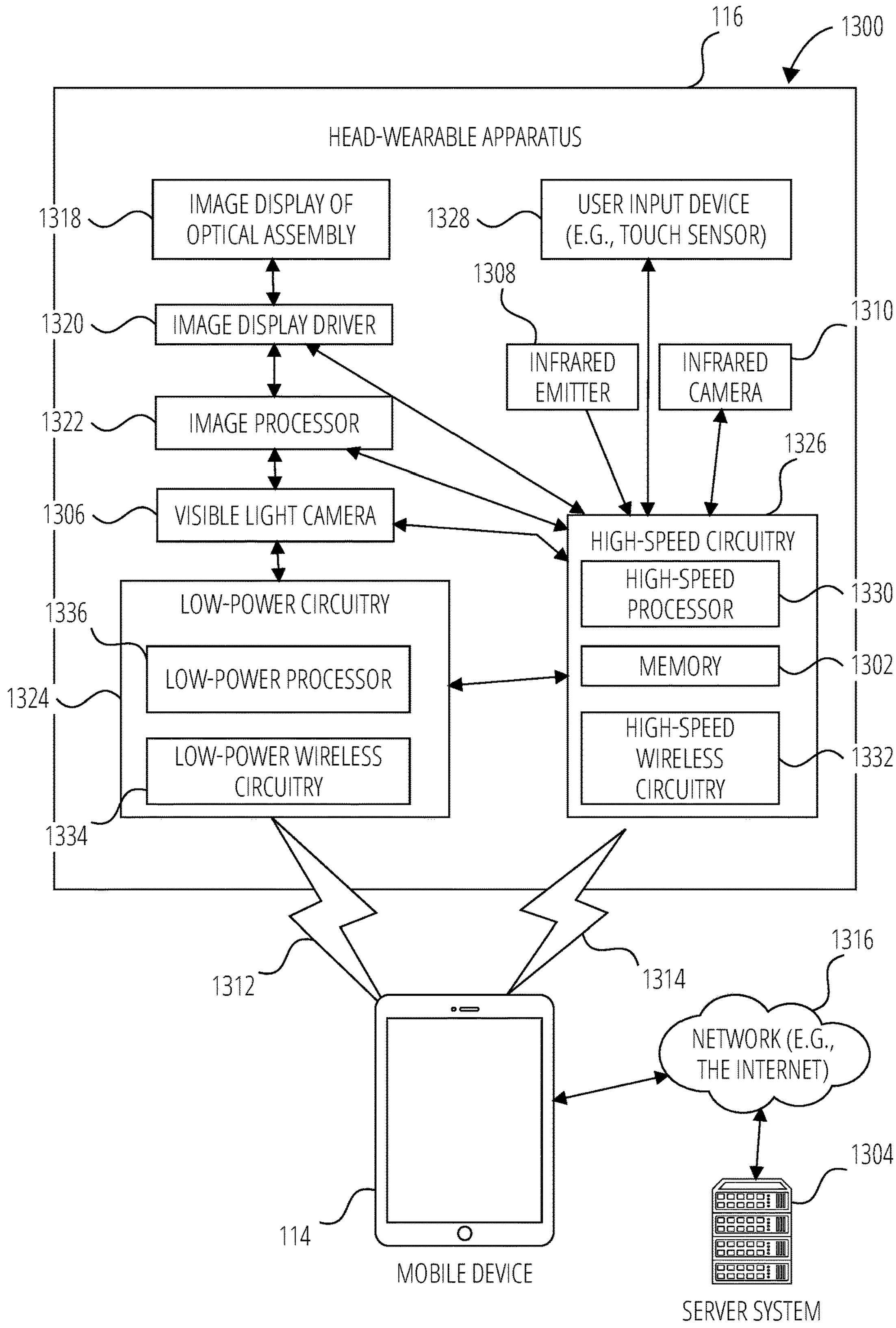
FIG. 13 illustrates a system including a head-wearable apparatus with a selector input device, according to some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 108. The networks 108 may include any combination of wired and wireless connections.

The head-wearable apparatus 116 includes one or more cameras, each of which may be, for example, a visible light camera 1306, an infrared emitter 1308, and an infrared camera 1310.

An interaction client, such as a mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of the image display of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a graphical user interface to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the graphical user interface of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 116. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WI-FI®. In some examples, other high-speed communications standards may be implemented by the high-speed wireless circuitry 1332.

The low-power wireless circuitry 1334 and the high-speed wireless circuitry 1332 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318.

While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or the low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 116 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

Machine Architecture

Figure 14:
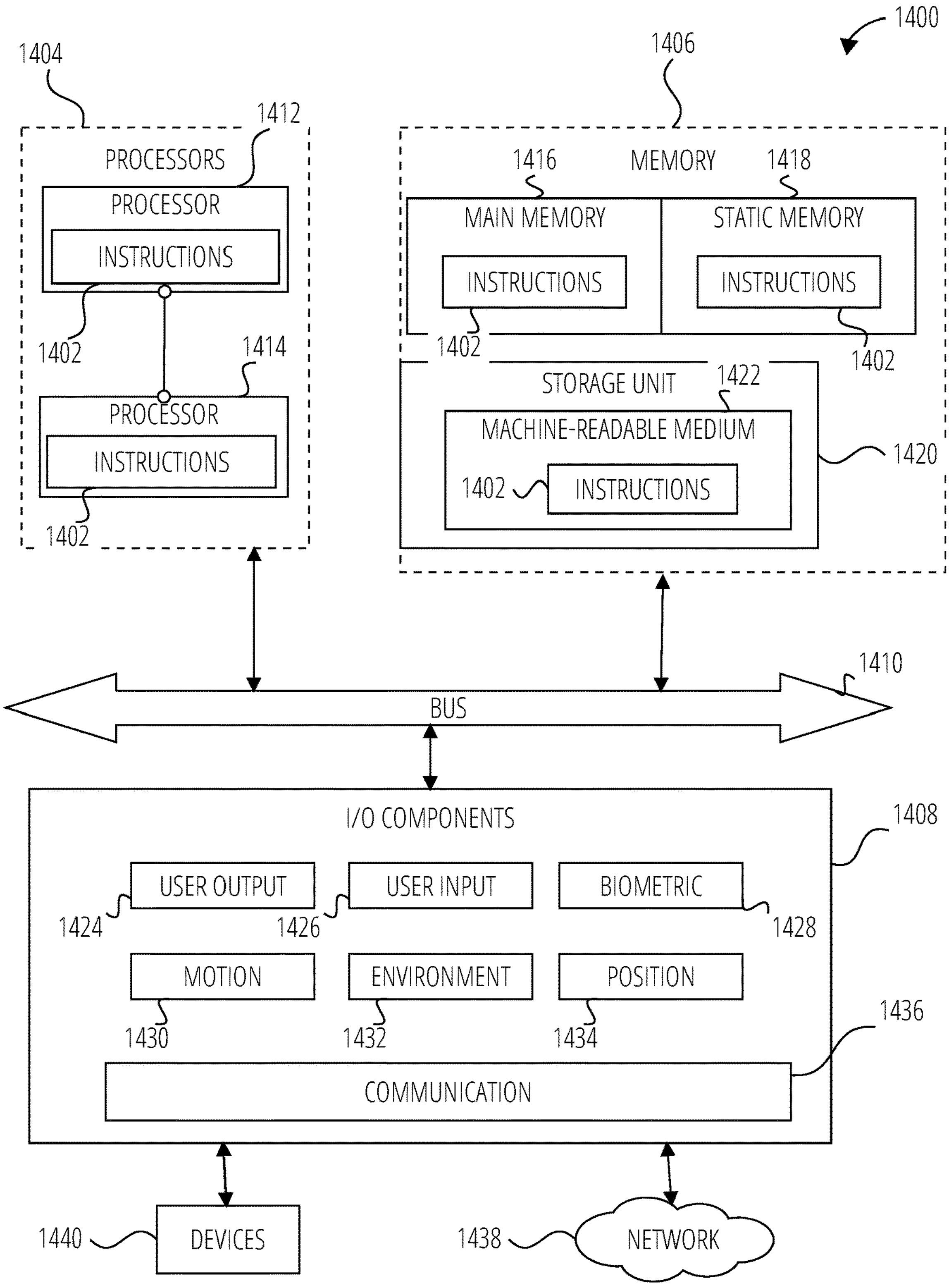
FIG. 14 is a diagrammatic representation of a machine in the form of a computer system within which a set of instructions may be executed to cause the machine to perform any one or more of the methodologies discussed herein, according to some examples.

FIG. 14 is a diagrammatic representation of the machine 1400 within which instructions 1402 (e.g., software, a program, an application, an applet, an app, or other executable code) for causing the machine 1400 to perform any one or more of the methodologies discussed herein may be executed. For example, the instructions 1402 may cause the machine 1400 to execute any one or more of the methods described herein. The instructions 1402 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1402, sequentially or otherwise, that specify actions to be taken by the machine 1400. Further, while a single machine 1400 is illustrated, the term "machine" shall also be taken to include a collection of machines that individually or jointly execute the instructions 1402 to perform any one or more of the methodologies discussed herein. The machine 1400, for example, may comprise the user system 102 or any one of multiple server devices forming part of the interaction server system 110. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1408, which may be configured to communicate with each other via a bus 1410. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that execute the instructions 1402. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1416, a static memory 1418, and a storage unit 1420, both accessible to the processors 1404 via the bus 1410. The main memory 1406, the static memory 1418, and storage unit 1420 store the instructions 1402 embodying any one or more of the methodologies or functions described herein. The instructions 1402 may also reside, completely or partially, within the main memory 1416, within the static memory 1418, within machine-readable medium 1422 within the storage unit 1420, within at least one of the processors 1404 (e.g., within the processor's cache memory), or any suitable combination thereof, during execution thereof by the machine 1400.

The I/O components 1408 may include a wide variety of components to receive input, provide output, produce output, transmit information, exchange information, capture measurements, and so on. The specific I/O components 1408 that are included in a particular machine will depend on the type of machine. For example, portable machines such as mobile phones may include a touch input device or other such input mechanisms, while a headless server machine will likely not include such a touch input device. It will be appreciated that the I/O components 1408 may include many other components that are not shown in FIG. 14. In various examples, the I/O components 1408 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1408 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1430 include acceleration sensor components (e.g., accelerometer), gravitation sensor components, rotation sensor components (e.g., gyroscope).

The environmental components 1432 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1408 further include communication components 1436 operable to couple the machine 1400 to a network 1438 or devices 1440 via respective coupling or connections. For example, the communication components 1436 may include a network interface component or another suitable device to interface with the network 1438. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1440 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1416, static memory 1418, and memory of the processors 1404) and storage unit 1420 may store one or more sets of instructions and data structures (e.g., software) embodying or used by any one or more of the methodologies or functions described herein. These instructions (e.g., the instructions 1402), when executed by processors 1404, cause various operations to implement the disclosed examples.

The instructions 1402 may be transmitted or received over the network 1438, using a transmission medium, via a network interface device (e.g., a network interface component included in the communication components 1436) and using any one of several well-known transfer protocols (e.g., hypertext transfer protocol (HTTP)). Similarly, the instructions 1402 may be transmitted or received using a transmission medium via a coupling (e.g., a peer-to-peer coupling) to the devices 1440.

Software Architecture

Figure 15:
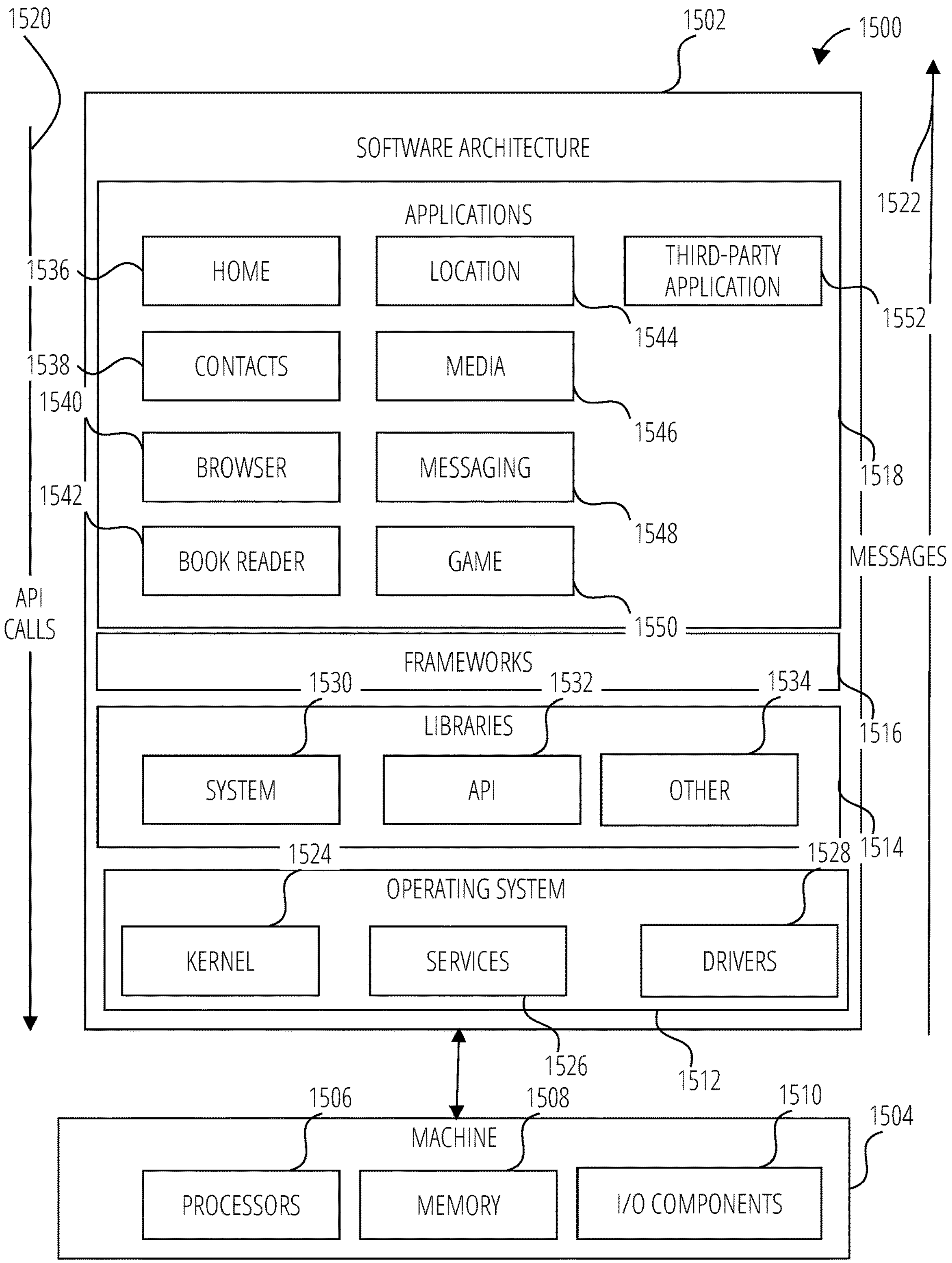
FIG. 15 is a block diagram showing a software architecture within which examples may be implemented.

FIG. 15 is a block diagram 1500 illustrating a software architecture 1502, which can be installed on any one or more of the devices described herein. The software architecture 1502 is supported by hardware such as a machine 1504 that includes processors 1506, memory 1508, and I/O components 1510. In this example, the software architecture 1502 can be conceptualized as a stack of layers, where each layer provides a particular functionality. The software architecture 1502 includes layers such as an operating system 1512, libraries 1514, frameworks 1516, and applications 1518. Operationally, the applications 1518 invoke API calls 1520 through the software stack and receive messages 1522 in response to the API calls 1520.

The operating system 1512 manages hardware resources and provides common services. The operating system 1512 includes, for example, a kernel 1524, services 1526, and drivers 1528. The kernel 1524 acts as an abstraction layer between the hardware and the other software layers. For example, the kernel 1524 provides memory management, processor management (e.g., scheduling), component management, networking, and security settings, among other functionalities. The services 1526 can provide other common services for the other software layers. The drivers 1528 are responsible for controlling or interfacing with the underlying hardware. For instance, the drivers 1528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1514 provide a common low-level infrastructure used by the applications 1518. The libraries 1514 can include system libraries 1530 (e.g., C standard library) that provide functions such as memory allocation functions, string manipulation functions, mathematic functions, and the like. In addition, the libraries 1514 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1514 can also include a wide variety of other libraries 1534 to provide many other APIs to the applications 1518.

The frameworks 1516 provide a common high-level infrastructure that is used by the applications 1518. For example, the frameworks 1516 provide various graphical user interface functions, high-level resource management, and high-level location services. The frameworks 1516 can provide a broad spectrum of other APIs that can be used by the applications 1518, some of which may be specific to a particular operating system or platform.

In an example, the applications 1518 may include a home application 1536, a contacts application 1538, a browser application 1540, a book reader application 1542, a location application 1544, a media application 1546, a messaging application 1548, a game application 1550, and a broad assortment of other applications such as a third-party application 1552. The applications 1518 are programs that execute functions defined in the programs. Various programming languages can be employed to create one or more of the applications 1518, structured in a variety of manners, such as object-oriented programming languages (e.g., Objective-C, Java, or C++) or procedural programming languages (e.g., C or assembly language). In a specific example, the third-party application 1552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1552 can invoke the API calls 1520 provided by the operating system 1512 to facilitate functionalities described herein.

Machine-Learning Pipeline

Figure 17:
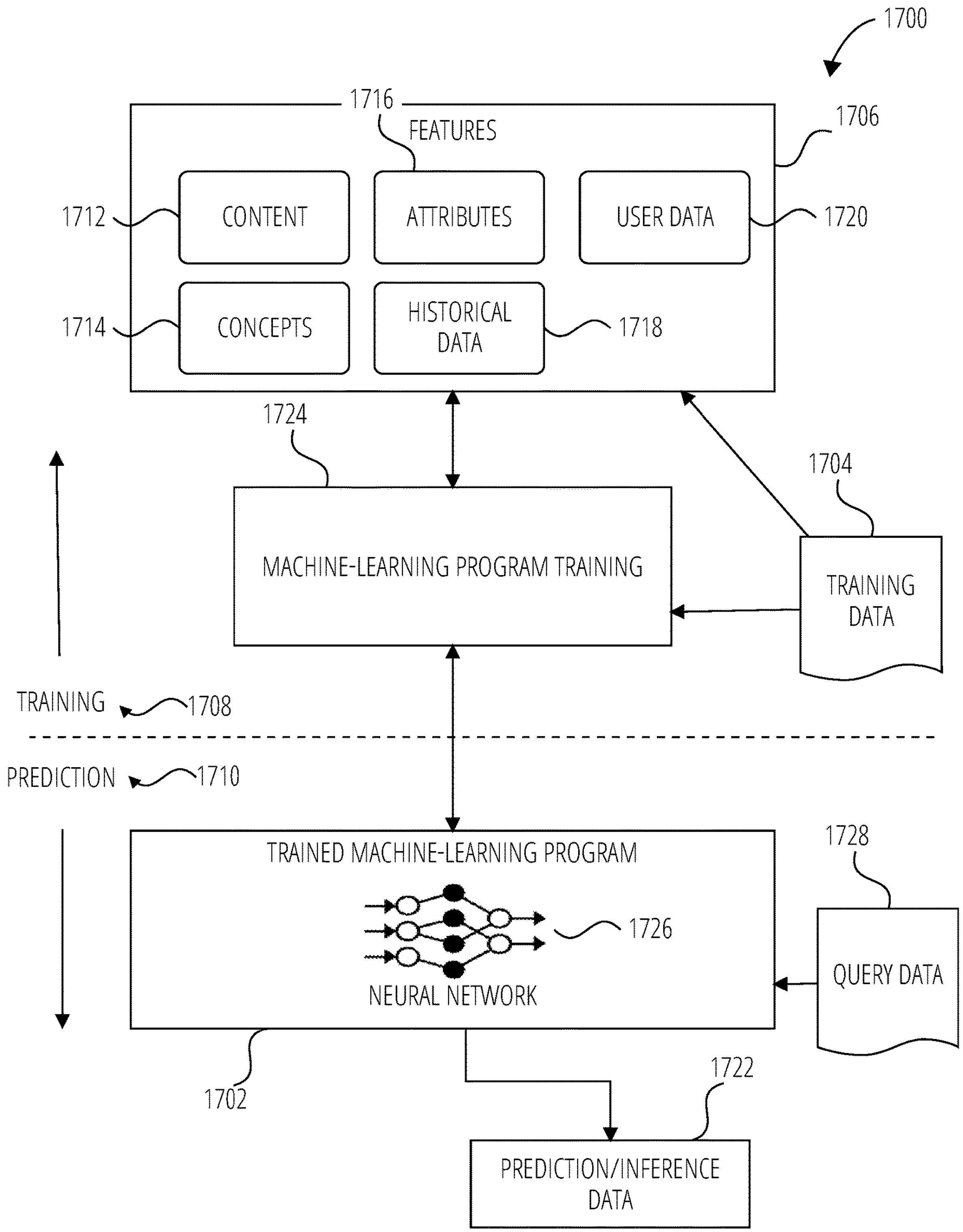
FIG. 17 illustrates training and use of a machine-learning program, according to some examples.

FIG. 17 is a flowchart depicting a machine-learning pipeline 1700, according to some examples. The machine-learning pipelines 1700 may be used to generate a trained model, for example the trained machine-learning program 1702 of FIG. 17, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 16:
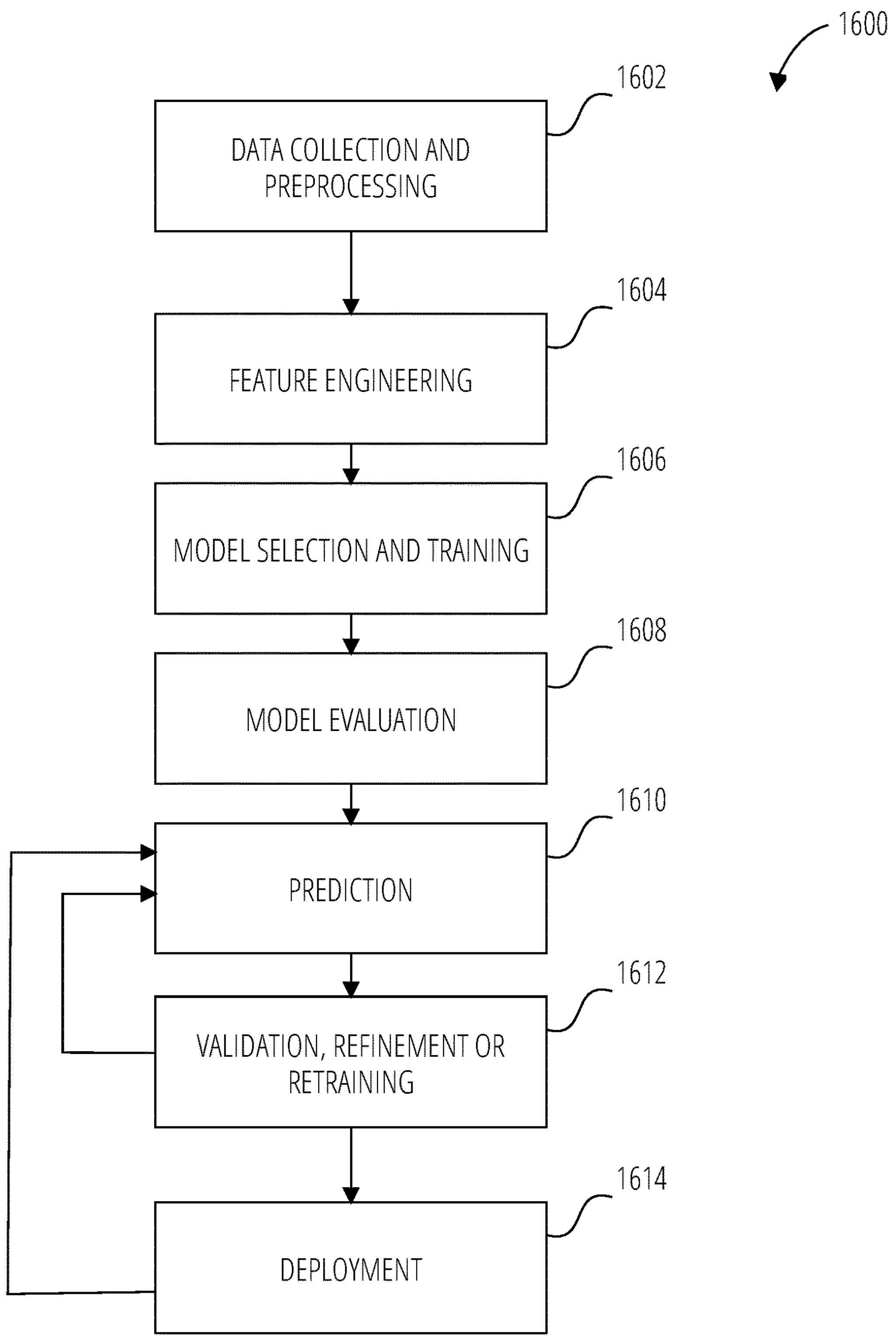
FIG. 16 illustrates a machine-learning pipeline, according to some examples.

Generating a trained machine-learning program 1702 may include multiple types of phases that form part of the machine-learning pipeline 1700, including for example the following phases 1600 illustrated in FIG. 16:

- Data collection and preprocessing 1602: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1604: This may include selecting and transforming the training data 1704 to create features that are useful for predicting the target variable. Feature engineering may include (1) receiving features 1706 (e.g., as structured or labeled data in supervised learning) and/or (2) identifying features 1706 (e.g., unstructured or unlabeled data for unsupervised learning) in training data 1704.
- Model selection and training 1606: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1608: This may include evaluating the performance of a trained model (e.g., the trained machine-learning program 1702) on a separate testing dataset. This can help determine if the model is overfitting or underfitting and if it is suitable for deployment.
- Prediction 1610: This involves using a trained model (e.g., trained machine-learning program 1702) to generate predictions on new, unseen data.
- Validation, refinement or retraining 1612: This may include updating a model based on feedback generated from the prediction phase, such as new data or user feedback.
- Deployment 1614: This may include integrating the trained model (e.g., the trained machine-learning program 1702) into a larger system or application, such as a web service, mobile app, or IoT device. This can involve setting up APIs, building a user interface, and ensuring that the model is scalable and can handle large volumes of data.

FIG. 17 illustrates two example phases, namely a training phase 1708 (part of the model selection and trainings 1606) and a prediction phase 1710 (part of prediction 1610). Prior to the training phase 1708, feature engineering 1604 is used to identify features 1706. This may include identifying informative, discriminating, and independent features for the effective operation of the trained machine-learning program 1702 in pattern recognition, classification, and regression. In some examples, the training data 1704 includes labeled data, which is known data for pre-identified features 1706 and one or more outcomes.

Each of the features 1706 may be a variable or attribute, such as individual measurable property of a process, article, system, or phenomenon represented by a data set (e.g., the training data 1704). Features 1706 may also be of different types, such as numeric features, strings, vectors, matrices, encodings, and graphs, and may include one or more of content 1712, concepts 1714, attributes 1716, historical data 1718 and/or user data 1720, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1708, the machine-learning pipeline 1700 uses the training data 1704 to find correlations among the features 1706 that affect a predicted outcome or prediction/inference data 1722.

With the training data 1704 and the identified features 1706, the trained machine-learning program 1702 is trained during the training phase 1708 during machine-learning program training 1724. The machine-learning program training 1724 appraises values of the features 1706 as they correlate to the training data 1704. The result of the training is the trained machine-learning program 1702 (e.g., a trained or learned model).

Further, the training phase 1708 may involve machine learning, in which the training data 1704 is structured (e.g., labeled during preprocessing operations), and the trained machine-learning program 1702 implements a relatively simple neural network 1726 capable of performing, for example, classification and clustering operations. In other examples, the training phase 1708 may involve deep learning, in which the training data 1704 is unstructured, and the trained machine-learning program 1702 implements a deep neural network 1726 that is able to perform both feature extraction and classification/clustering operations.

A neural network 1726 may, in some examples, be generated during the training phase 1708, and implemented within the trained machine-learning program 1702. The neural network 1726 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1726 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1726 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a CNN, a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1708, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1726 is iteratively trained by adjusting model parameters to minimize a specific loss function or maximize a certain objective. The system can continue to train the neural network 1726 by adjusting parameters based on the output of the validation, refinement, or retraining block 1612, and rerun the prediction 1610 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1726 even after deployment 1614 of the neural network 1726. The neural network 1726 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1710, the trained machine-learning program 1702 uses the features 1706 for analyzing query data 1728 to generate inferences, outcomes, or predictions, as examples of a prediction/inference data 1722. For example, during prediction phase 1710, the trained machine-learning program 1702 is used to generate an output. Query data 1728 is provided as an input to the trained machine-learning program 1702, and the trained machine-learning program 1702 generates the prediction/inference data 1722 as output, responsive to receipt of the query data 1728. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1702 may be a generative AI model. Generative AI is a term that may refer to any type of AI that can create new content from training data 1704. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis.
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1722 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: determining participation in an interaction function by a first user of an interaction system; identifying an image associated with the participation; processing data associated with the image using a first machine learning model to identify one or more features within the image; generating a prompt based on the identified one or more features; identifying one or more instructions for a second machine learning model; processing data associated with a combination of the prompt and the identified one or more instructions using the second machine learning model to generate a textual response to the image, wherein the second machine learning model comprises a Large Language Model (LLM); and causing display of the textual response within the interaction function to the first user.

In Example 2, the subject matter of Example 1 includes, wherein the interaction function includes a chat window configured to display exchanged messages between the first user and a second user, wherein causing display of the textual response comprises displaying text adjacent to a copy of the image.

In Example 3, the subject matter of Example 2 includes, wherein causing display of the textual response includes: reducing a size of at least a portion of the chat window in a user interface; and apportioning user interface space for display of the textual response.

In Example 4, the subject matter of Example 3 includes, wherein the operations further comprise initiating display of the generated response adjacent to the copy of the image in the apportioned user interface space, wherein in response to a user selection to send the response into the chat window, causing display of the generated response adjacent to the copy of the image within the chat window.

In Example 5, the subject matter of Examples 1-4 includes, wherein identifying the one or more features comprises generating text indicative of such features, wherein the prompt is generated based on the generated text.

In Example 6, the subject matter of Examples 1-5 includes, wherein the interaction function includes a chat window configured to display exchanged messages between the first user and the LLM.

In Example 7, the subject matter of Examples 1-6 includes, wherein the operations further comprise identifying a location of the first user and further processing data associated with the location using the second machine learning model to generate the textual response to the image.

In Example 8, the subject matter of Examples 1-7 includes, wherein the image is a frame from a video, wherein the textual response is a response to the video.

In Example 9, the subject matter of Examples 1-8 includes, wherein identifying the one or more features comprises identifying a sentiment within the image.

In Example 10, the subject matter of Examples 1-9 includes, wherein the image is a frame from a camera feed of a camera system, wherein the textual response includes applying at least one recommended content augmentation to the camera feed, the at least one recommended content augmentation augments, modifies, or overlays content onto the camera feed with one or more digital elements, wherein one or more digital elements include at least one of: an image, an animation, or audio.

In Example 11, the subject matter of Example 10 includes, wherein the at least one recommended content augmentation comprises the generated prompt, the operations further comprising: displaying a selectable user interface element; and in response to a user selection of the selectable user interface element, capturing a picture or video of the camera feed with the applied at least one recommended content augmentation.

In Example 12, the subject matter of Examples 1-11 includes, wherein the operations further comprise processing the identified one or more features using a third machine learning model to filter inappropriate features from the one or more features, wherein generating the prompt is based on the filtered features.

In Example 13, the subject matter of Examples 1-12 includes, wherein the operations further comprise processing the prompt using a third machine learning model to filter the prompt for inappropriate characteristics, wherein processing data associated with a combination of the prompt and the identified one or more instructions comprises processing data associated with the filtered prompt.

In Example 14, the subject matter of Example 13 includes, wherein the inappropriate characteristics comprise at least one of: content pertaining to a gender, an aesthetic characteristic, a private body part, a political topic, a religious topic, or a sexual orientation.

In Example 15, the subject matter of Examples 1-14 includes, wherein the first machine learning model is trained to identify features within images, wherein the second machine learning model is trained to generate responses based on prompts and instructions.

In Example 16, the subject matter of Examples 1-15 includes, wherein the operations are performed by a third machine learning model, wherein the third machine learning model is configured to generate textual responses based on images by facilitating communication with the first and second machine learning models.

In Example 17, the subject matter of Example 16 includes, wherein the operations further comprise: training the third machine learning model by: identifying training images and corresponding training textual responses expected for the training images; applying the training images to the third machine learning model to receive output textual responses, wherein applying the training images initiates use of the first and second machine learning models by the third machine learning model; compare the output textual responses with the expected textual responses to determine a loss parameter for the third machine learning model; and update a characteristic of the third machine learning model based on the loss parameter.

In Example 18, the subject matter of Examples 1-17 includes, wherein the one or more instructions include generating a response mimicking the first user in communication with another user.

Example 19 is a method comprising: determining participation in an interaction function by a first user of an interaction system; identifying an image associated with the participation; processing data associated with the image using a first machine learning model to identify one or more features within the image; generating a prompt based on the identified one or more features; identifying one or more instructions for a second machine learning model; processing data associated with a combination of the prompt and the identified one or more instructions using the second machine learning model to generate a textual response to the image, wherein the second machine learning model comprises a Large Language Model (LLM); and causing display of the textual response within the interaction function to the first user.

Example 20 is a non-transitory computer-readable storage medium storing instructions that, when executed by at least one processor, cause the at least one processor to perform operations comprising: determining participation in an interaction function by a first user of an interaction system; identifying an image associated with the participation; processing data associated with the image using a first machine learning model to identify one or more features within the image; generating a prompt based on the identified one or more features; identifying one or more instructions for a second machine learning model; processing data associated with a combination of the prompt and the identified one or more instructions using the second machine learning model to generate a textual response to the image, wherein the second machine learning model comprises a Large Language Model (LLM); and causing display of the textual response within the interaction function to the first user.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. "Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "User device" refers, for example, to a device accessed, controlled or owned by a user and with which the user interacts with to perform an action or interaction on the user device, including an interaction with other users or computer systems. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., EPROM, EEPROM, FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine. "User device" refers, for example, to a device accessed, controlled or owned by a user and with which the user interacts with to perform an action or interaction on the user device, including an interaction with other users or computer systems. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled or owned by a user and with which the user interacts with to perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:

at least one processor; and at least one memory component storing instructions that, when executed by the at least one processor, cause the at least one processor to perform operations comprising:

determining participation in an interaction function by a first user of an interaction system;

identifying an image associated with the participation;

processing data associated with the image using a first machine learning model to identify one or more features within the image;

generating a prompt based on the identified one or more features;

identifying one or more instructions for a second machine learning model;

processing data associated with a combination of the prompt and the identified one or more instructions using the second machine learning model to generate a textual response to the image, wherein the second machine learning model comprises a Large Language Model (LLM); and causing display of the textual response within the interaction function to the first user.

2. The system of claim 1, wherein the interaction function includes a chat window configured to display exchanged messages between the first user and a second user, wherein causing display of the textual response comprises displaying text adjacent to a copy of the image.

3. The system of claim 2, wherein causing display of the textual response includes:

reducing a size of at least a portion of the chat window in a user interface; and apportioning user interface space for display of the textual response.

4. The system of claim 3, wherein the operations further comprise initiating display of the generated textual response adjacent to the copy of the image in the apportioned user interface space, wherein in response to a user selection to send the response into the chat window, causing display of the generated textual response adjacent to the copy of the image within the chat window.

5. The system of claim 1, wherein identifying the one or more features comprises generating text indicative of such features, wherein the prompt is generated based on the generated text.

6. The system of claim 1, wherein the interaction function includes a chat window configured to display exchanged messages between the first user and the LLM.

7. The system of claim 1, wherein the operations further comprise identifying a location of the first user and further processing data associated with the location using the second machine learning model to generate the textual response to the image.

8. The system of claim 1, wherein the image is a frame from a video, wherein the generated textual, textual response is a response to the video.

9. The system of claim 1, wherein identifying the one or more features comprises identifying a sentiment within the image.

10. The system of claim 1, wherein the image is a frame from a camera feed of a camera system, wherein the generated textual textual response includes applying at least one recommended content augmentation to the camera feed, the at least one recommended content augmentation augments, modifies, or overlays content onto the camera feed with one or more digital elements, wherein the one or more digital elements include at least one of: an image, an animation, or audio.

11. The system of claim 10, wherein the at least one recommended content augmentation comprises the generated prompt, the operations further comprising:

displaying a selectable user interface element; and in response to a user selection of the selectable user interface element, capturing a picture or video of the camera feed with the applied at least one recommended content augmentation.

12. The system of claim 1, wherein the operations further comprise processing the identified one or more features using a third machine learning model to filter features from the one or more features, wherein generating the prompt is based on the filtered features.

13. The system of claim 1, wherein the operations further comprise processing the prompt using a third machine learning model to filter the prompt for inappropriate characteristics, wherein processing data associated with a combination of the prompt and the identified one or more instructions comprises processing data associated with the filtered prompt.

14. The system of claim 13, wherein the inappropriate characteristics comprise at least one of: content pertaining to a gender, an aesthetic characteristic, a private body part, a political topic, a religious topic, or a sexual orientation.

15. The system of claim 1, wherein the first machine learning model is trained to identify features within images, wherein the second machine learning model is trained to generate responses based on prompts and instructions.

16. The system of claim 1, wherein the operations are performed by a third machine learning model, wherein the third machine learning model is configured to generate textual responses based on images by facilitating communication with the first and second machine learning models.

17. The system of claim 16, wherein the operations further comprise:

training the third machine learning model by:

identifying training images and corresponding training textual responses expected for the training images;

applying the training images to the third machine learning model to receive output textual responses, wherein applying the training images initiates use of the first and second machine learning models by the third machine learning model;

compare the output textual responses with the expected textual responses to determine a loss parameter for the third machine learning model; and update a characteristic of the third machine learning model based on the loss parameter.

18. The system of claim 1, wherein the one or more instructions include generating a response mimicking the first user in communication with another user.

19. A method comprising:

determining participation in an interaction function by a first user of an interaction system;

identifying an image associated with the participation;

processing data associated with the image using a first machine learning model to identify one or more features within the image;

generating a prompt based on the identified one or more features;

identifying one or more instructions for a second machine learning model;

processing data associated with a combination of the prompt and the identified one or more instructions using the second machine learning model to generate a textual response to the image, wherein the second machine learning model comprises a Large Language Model (LLM); and causing display of the textual response within the interaction function to the first user.

20. A non-transitory computer-readable storage medium storing instructions that, when executed by at least one processor, cause the at least one processor to perform operations comprising:

determining participation in an interaction function by a first user of an interaction system;

identifying an image associated with the participation;

processing data associated with the image using a first machine learning model to identify one or more features within the image;

generating a prompt based on the identified one or more features;

identifying one or more instructions for a second machine learning model;

processing data associated with a combination of the prompt and the identified one or more instructions using the second machine learning model to generate a textual response to the image, wherein the second machine learning model comprises a Large Language Model (LLM); and causing display of the textual response within the interaction function to the first user.

* * * * *

UNITED STATES PATENT AND TRADEMARK OFFICE

CERTIFICATE OF CORRECTION

PATENT NO. : 12,437,160 B2
APPLICATION NO. : 18/462255
DATED : October 7, 2025
INVENTOR(S) : Mikhailiuk et al.

It is certified that error appears in the above-identified patent and that said Letters Patent is hereby corrected as shown below:

In the Claims

In Column 47, Line 57, in Claim 8, delete “textual, textual” and insert --textual-- therefor In Column 47, Line 64, in Claim 10, delete “textual textual” and insert --textual-- therefor Signed and Sealed this
Ninth Day of December, 2025

John A. Squires
*Director of the United States Patent and Trademark Office*